(12) United States Patent
Makino

(10) Patent No.: US 11,775,238 B2
(45) Date of Patent: Oct. 3, 2023

(54) IMAGE FORMING APPARATUS, IMAGE FORMING SYSTEM, AND IMAGE FORMING METHOD FOR COLOR DIFFERENCE CALCULATION

(71) Applicant: Yoji Makino, Kanagawa (JP)

(72) Inventor: Yoji Makino, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/048,569

(22) Filed: Oct. 21, 2022

(65) Prior Publication Data
US 2023/0135640 A1     May 4, 2023

(30) Foreign Application Priority Data

Oct. 29, 2021   (JP) ................. 2021-177701
May 10, 2022   (JP) ................. 2022-077436

(51) Int. Cl.
*H04N 1/60* (2006.01)
*G06F 3/12* (2006.01)
*G01J 3/46* (2006.01)
*H04N 1/00* (2006.01)
*H04N 1/62* (2006.01)

(52) U.S. Cl.
CPC ............ *G06F 3/1256* (2013.01); *G01J 3/462* (2013.01); *G06F 3/1208* (2013.01); *G06F 3/1267* (2013.01); *H04N 1/0044* (2013.01); *H04N 1/6027* (2013.01); *H04N 1/62* (2013.01); *G01J 2003/467* (2013.01)

(58) Field of Classification Search
CPC ... G01J 2003/467; G01J 3/463; G06F 3/1208; G06F 3/1256; H04N 1/0044; H04N 1/6027; H04N 1/62

USPC ........ 358/1.18, 504, 518, 1.9; 382/112, 167, 382/190
See application file for complete search history.

(56) References Cited

U.S. PATENT DOCUMENTS

| 4,959,669 | A  * | 9/1990  | Haneda ............... H04N 1/6033 347/900 |
| 2004/0207862 | A1 * | 10/2004 | Such ................. H04N 1/00053 358/1.9 |
| 2006/0092442 | A1 | 5/2006 | Such et al. |
| 2009/0263149 | A1 | 10/2009 | Makino |

(Continued)

FOREIGN PATENT DOCUMENTS

| JP | 2013-021467 | 1/2013 |
| JP | 2014-082618 | 5/2014 |

(Continued)

OTHER PUBLICATIONS

Extended European Search Report for 22203683.2 dated Mar. 7, 2023.

*Primary Examiner* — Jamares Q Washington
(74) *Attorney, Agent, or Firm* — IPUSA, PLLC

(57) ABSTRACT

An image forming apparatus includes circuitry. The circuitry extracts a colorimetric area from an image formation area based on designation according to an operation by a user, the image formation area in which an image as a print target is to be formed. The circuitry calculates a color difference between a first page and a second page subsequent to the first page based on a colorimetric value in the extracted colorimetric area and to determine whether to continue printing according to the calculated color difference.

18 Claims, 18 Drawing Sheets

(56) References Cited

U.S. PATENT DOCUMENTS

| | | | |
|---|---|---|---|
| 2014/0160534 A1* | 6/2014 | Nakamura | H04N 1/00795 358/3.24 |
| 2015/0220819 A1 | 8/2015 | Yamamoto et al. | |
| 2018/0001658 A1* | 1/2018 | Gracia Verdugo | H04N 1/6044 |
| 2019/0297226 A1* | 9/2019 | Ohkubo | H04N 1/00045 |

FOREIGN PATENT DOCUMENTS

| | | | | |
|---|---|---|---|---|
| JP | 2014-182353 | | 9/2014 | |
| JP | 2016-001843 | | 1/2016 | |
| JP | 2020-038483 | | 3/2020 | |
| JP | 2020-151989 | | 9/2020 | |
| WO | WO-2004070331 A1 * | 8/2004 | | G01J 3/52 |

* cited by examiner

FIG. 14

| Color difference information | | | | | |
|---|---|---|---|---|---|
| Job No. | Print date ↓ | Job constituting pages | Total number of pages | Color difference average ΔE | Maximum color difference ΔE | Maximum color difference page number |
| 180 | 2020/09/26 10:18:23 | 16 | 1600 | 2.6 | 2.9 | 900 |
| 237 | 2020/09/28 14:23:40 | 10 | 800 | 2.3 | 2.7 | 360 |
| 350 | 2020/10/01 11:16:12 | 26 | 1300 | 3.2 | 4.8 | 760 |

913 911 912

IMAGE FORMING APPARATUS, IMAGE FORMING SYSTEM, AND IMAGE FORMING METHOD FOR COLOR DIFFERENCE CALCULATION

CROSS-REFERENCE TO RELATED APPLICATIONS

This patent application is based on and claims priority pursuant to 35 U.S.C. § 119(a) to Japanese Patent Application Nos. 2021-177701, filed on Oct. 29, 2021, and 2022-077436, filed on May 10, 2022, in the Japan Patent Office, the entire disclosure of which is hereby incorporated by reference herein.

BACKGROUND

Technical Field

Embodiments of the present disclosure relate to an image forming apparatus, an image forming system, and an image forming method.

Related Art

A technology has been developed that corrects the gradation of colors used for printing in an image forming apparatus. For example, color stabilization processing is known that reads a material printed by an image forming apparatus with a sensor and compares the read color with a target color, to correct the gradation of image data to be printed.

For example, a technology is known that prints an image combined with an area to be measured outside a print area of an image to be printed in response to a printing request, in other words, near an edge of a sheet of paper. In this technology, evaluation as to whether image quality is satisfied is performed based on a color measurement result of the area to be measured.

Further, for example, a technology is known that, in a case that an image correction pattern is added to an image as a reference for inspection or a read image, inspects the image while excluding an area including the image correction pattern from an inspection target.

SUMMARY

An embodiment of the present disclosure includes an image forming apparatus including circuitry. The circuitry extracts a colorimetric area from an image formation area based on designation according to an operation by a user, the image formation area in which an image as a print target is to be formed. The circuitry calculates a color difference between a first page and a second page subsequent to the first page based on a colorimetric value in the extracted colorimetric area and to determine whether to continue printing according to the calculated color difference.

An embodiment of the present disclosure includes an image forming system including an image forming apparatus and a user terminal. The user terminal receives designation of an exclusion area, which is an area to be excluded from an area for which colorimetry is to be performed in an image formation area in which an image as a print target is to be formed, or designation of an area for which colorimetry is to be performed in the image formation area. The image forming apparatus includes circuitry. The circuitry extracts a colorimetric area from the image formation area based on the designation of the exclusion area or the area for which the colorimetry is to be performed. The circuitry calculates a color difference per copies based on a colorimetric value in the extracted colorimetric area and to determine whether to continue printing according to the calculated color difference.

An embodiment of the present disclosure includes an image forming method performed by one or more computers. The method includes extracting a colorimetric area from an image formation area in which an image as a print target is formed. The method includes calculating a color difference per copies based on a colorimetric value in the extracted colorimetric area. The method includes determining whether to continue printing according to the calculated color difference.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 14 is an illustration of an example of a color difference information display screen, according to an embodiment of the present disclosure;

Figure 1:
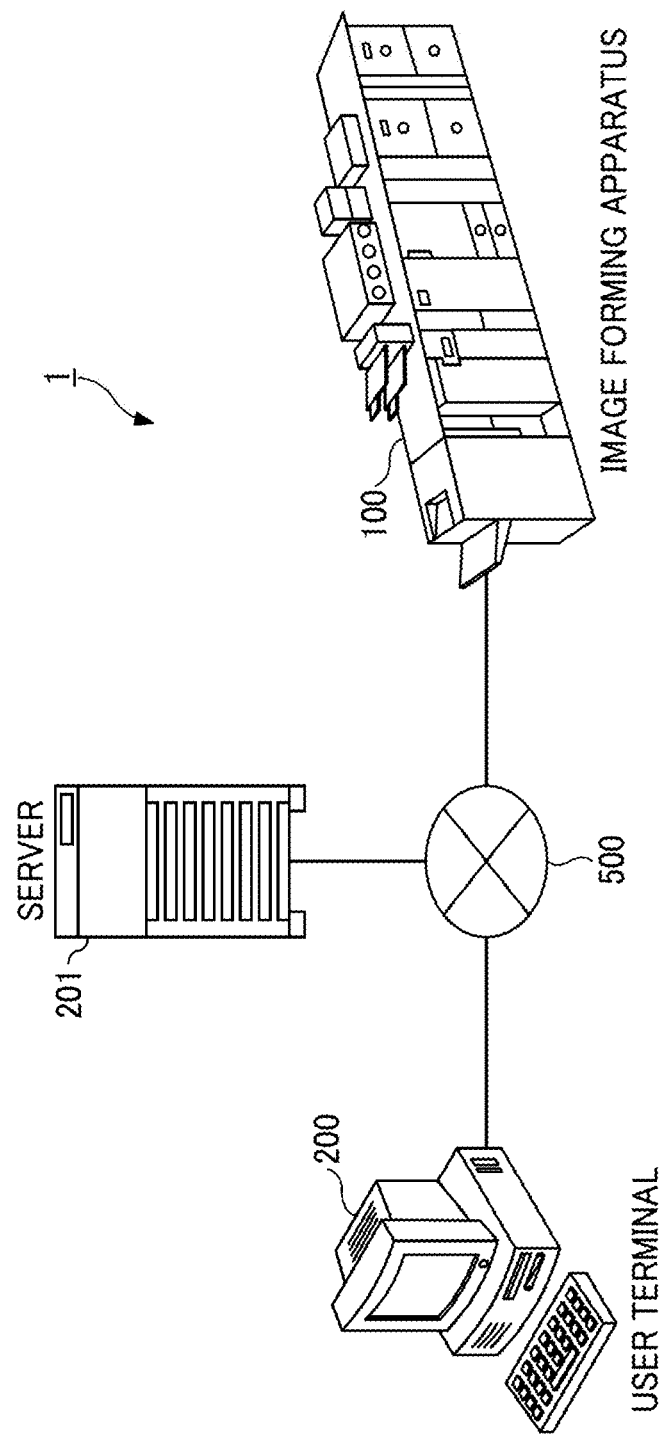
FIG. 1 is a schematic diagram illustrating an example of an overall configuration of an image forming system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

First Embodiment

Embodiments of an image forming system according to the present disclosure are described with reference to the drawings.

FIG. 1 is a schematic diagram illustrating an example of an overall configuration of the image forming system 1 according to the embodiment.

The image forming system 1 includes an image forming apparatus 100, a user terminal 200, and a server 201. The image forming apparatus 100, the user terminal 200, and the server 201 are communicably connected to each other through a communication network 500.

The image forming apparatus 100 is an apparatus that forms an image. Examples of the image forming apparatus 100 include, but are not limited to, a color production printer, a laser printer, and an inkjet printer. The image forming apparatus 100 receives image data from the user terminal 200 or the server 201 and prints an image on a sheet according to the received image data. The sheet is an example of a conveyance medium on which an image is to be formed.

The user terminal 200 is a terminal that instruct to print an image according to a user's operation. Specifically, the user terminal 200 transmits printing job data including the image data to the image forming apparatus 100 or the server 201. Further, the user terminal 200 transmits information indicating a threshold value to be used for color stabilization processing to the image forming apparatus 100, according to a user's operation.

Furthermore, the user terminal 200 receives display data indicating an execution status of the color stabilization processing from the image forming apparatus 100, and displays a screen indicating the execution status of the color stabilization processing.

The server 201 is an information processing apparatus that manages, for example, printing job data or a color profile. In response to receiving the printing job data from the user terminal 200, the server 201 adds the received printing job data as a queue to a memory that stores printing job data waiting to be printed. Further, the server 201 extracts certain printing job data from the queue in the order in which multiple pieces of printing job data are added to the queue or according to a priority that is appropriately set. Then, the server 201 transmits the extracted printing job data to the image forming apparatus 100.

The communication network 500 is, for example, a local area network (LAN) or the Internet. The communication network 500 is a network that implements data communication.

Figure 2:
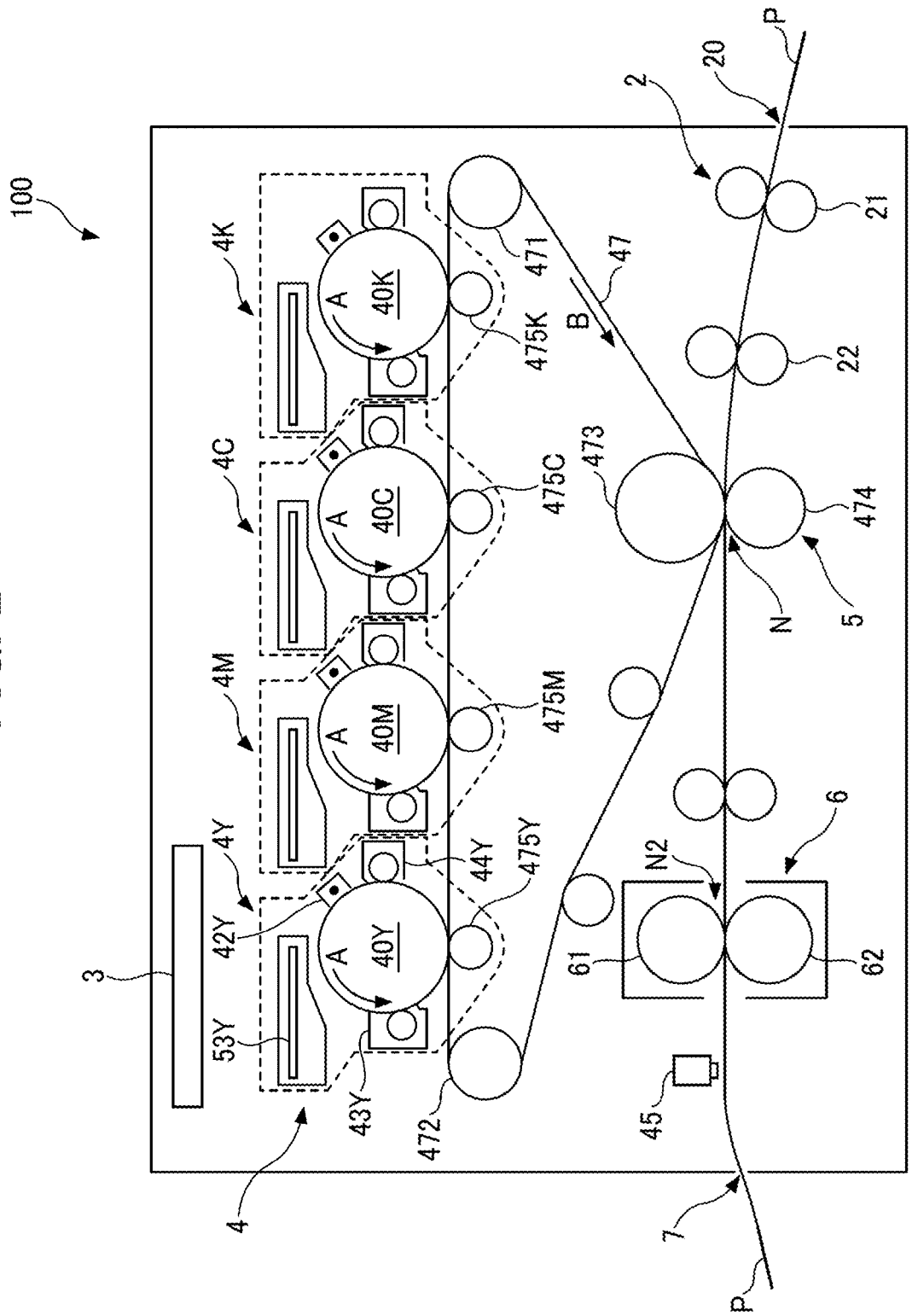
FIG. 2 is a diagram illustrating an internal structure of an image forming apparatus, according to an embodiment of the present disclosure.

FIG. 2 is a diagram illustrating an internal structure of the image forming apparatus 100 according to the embodiment.

The image forming apparatus 100 includes an image forming mechanism 4, a sheet feeder 2, a transfer device 5, a fixing device 6, a measuring sensor 45, and a sheet ejection unit 7.

The sheet feeder 2 conveys a sheet P to the image forming mechanism 4. The sheet feeder 2 includes a sheet feeding port 20, a feed roller 21, and a registration roller pair 22.

The sheet feeding port 20 is an opening from which the sheet P is fed to the image forming mechanism 4. The feed roller 21 is a roller that conveys the sheet P fed from the sheet feeding port 20 to the transfer device 5. The registration roller pair 22 is a pair of rollers that sends out the sheet P conveyed from the feed roller 21 to the transfer device 5 at a predetermined timing.

The image forming mechanism 4 forms an image on the sheet P. The image forming mechanism 4 includes four process units, i.e., a process unit 4Y, a process unit 4M, a process unit 4C, and a process unit 4K. The process unit 4Y, the process unit 4M, the process unit 4C, and the process unit 4K respectively correspond to yellow (Y), magenta (M), cyan (C), and black (K), which are multiple basic colors for transferring a toner image to a transfer belt 47. The process unit 4Y, the process unit 4M, the process unit 4C, and the process unit 4K respectively include a photoconductor 40Y, a photoconductor 40M, a photoconductor 40C, and a photoconductor 40K, each being drum-shaped image bearer. The process unit 4Y, the process unit 4M, the process unit 4C, and the process unit 4K have the same configurations. In the disclosure, a configuration of the process unit 4Y corresponding to yellow (Y) is described and redundant descriptions are omitted below.

The process unit 4Y includes the photoconductor 40Y, a charging device 42Y, a laser unit 53Y, a developing device 43Y, a primary transfer roller 475Y, and a cleaning device 44Y.

The photoconductor 40Y is a drum-shaped member, which is an image bearer as a rotating member that rotates in a direction A, which is a counterclockwise direction as illustrated in FIG. 2. The photoconductor 40Y includes a photosensitive layer, which is a surface to be scanned to which the laser unit 53Y emits scanning light. The charging device 42Y is a device that charges the photoconductor 40Y. The laser unit 53Y is a unit that emits scanning light, to form a latent image on the photoconductor 40Y. The developing device 43Y is a device that develops the latent image formed on the photoconductor 40Y by the laser unit 53Y with yellow (Y) toner to form a toner image. The primary transfer roller 475Y is a roller that transfers the toner image formed on the photoconductor 40Y to the transfer belt 47 wound around a plurality of rollers described below including the primary transfer roller. The cleaning device 44Y is a device that removes excess toner remaining on the photoconductor 40Y after the toner image is transferred to the transfer belt 47.

The image forming mechanism 4 forms a toner image, which is an image of mixed colors, on the transfer belt 47 by mixing the basic colors on the basis of original data (input image) by the process unit 4Y, the process unit 4M, the process unit 4C, and the process unit 4K.

The transfer device 5 transfers the toner image formed on the transfer belt 47 onto the sheet P. The transfer device 5 includes the transfer belt 47, a drive roller 471, a driven roller 472, and a secondary transfer roller 473.

The transfer belt 47 is a belt that is made of a stretch-resistant resin material, such as polyimide, in which carbon powder is dispersed to adjust electrical resistance. The transfer belt 47 is wound around the drive roller 471, the driven roller 472, the secondary transfer roller 473, and the primary transfer roller 475Y, a primary transfer roller 475M, a primary transfer roller 475C, and a primary transfer roller 475K.

A driving source drives the drive roller 471 to rotate in a direction indicated by arrow B in FIG. 2. The driven roller 472 rotates in the direction indicted by arrow B in substantially the same manner as the drive roller 471.

The secondary transfer roller 473 is a roller that contacts an opposing roller via the transfer belt 47 to form a nip at a secondary transfer position N. The transfer belt 47 is nipped together with the sheet P at the secondary transfer position N between the secondary transfer roller 473 and the opposing roller, where a secondary transfer bias is applied to transfer the toner image on the surface of the transfer belt 47 onto the sheet P. As the secondary transfer bias, a charge having a polarity opposite to a static charge that is charged on the surface of the transfer belt 47 is applied. The sheet P onto which the toner image is transferred at the secondary transfer position N is conveyed to the fixing device 6.

The measuring sensor 45 measures reflection characteristics of the image fixed on the sheet P. The measuring sensor 45 is an in-line chromaticity measuring device in which multiple monochrome line sensors are combined. In preceding stages of the multiple monochrome line sensors, band pass filters respectively corresponding to three colors to be measured, i.e., R (red), G (green), and B (blue) are provided, so that the multiple monochrome line sensors have sensitivity to the three colors.

The measuring sensor 45 includes measuring channels having three spectral characteristics corresponding to three colors of R (red), G (green), and B (blue). The number of measuring channels that the measuring sensor 45 includes is referred to as a "measuring channel number". The measuring sensor 45 is provided downstream from a fixing nip N2 in the conveyance direction of the sheet P, and measures reflection characteristics of an entirety or a part of the image (color image) formed on the sheet P.

In another example, the measuring sensor 45 includes a measuring channel having at least one spectral characteristic, in other words, a measuring channel that has sensitivity to one or more basic colors. For example, the measuring sensor 45 is a so-called color scanner. In another example, the measuring sensor 45 is a monochrome line sensor having a single spectral characteristic.

The fixing device 6 fixes the image on the sheet P transferred by the transfer device 5. When the sheet P passes through the fixing nip N2 formed between a heating roller 61 and a fixing roller 62, the fixing device 6 fixes the toner image borne on the sheet P by the action of heat and pressure, to form a good color image on the sheet P. The sheet P on which the toner image is fixed through the fixing device 6 is ejected from the sheet ejection unit 7 to the outside of the image forming mechanism 4.

The sheet ejection unit 7 ejects the sheet P to the outside. For example, the sheet ejection unit 7 includes a switching pawl and a duplex unit and conveys the sheet P into the duplex unit according to a mode of the switching pawl, to form images on both sides of the sheet P.

Figure 3:
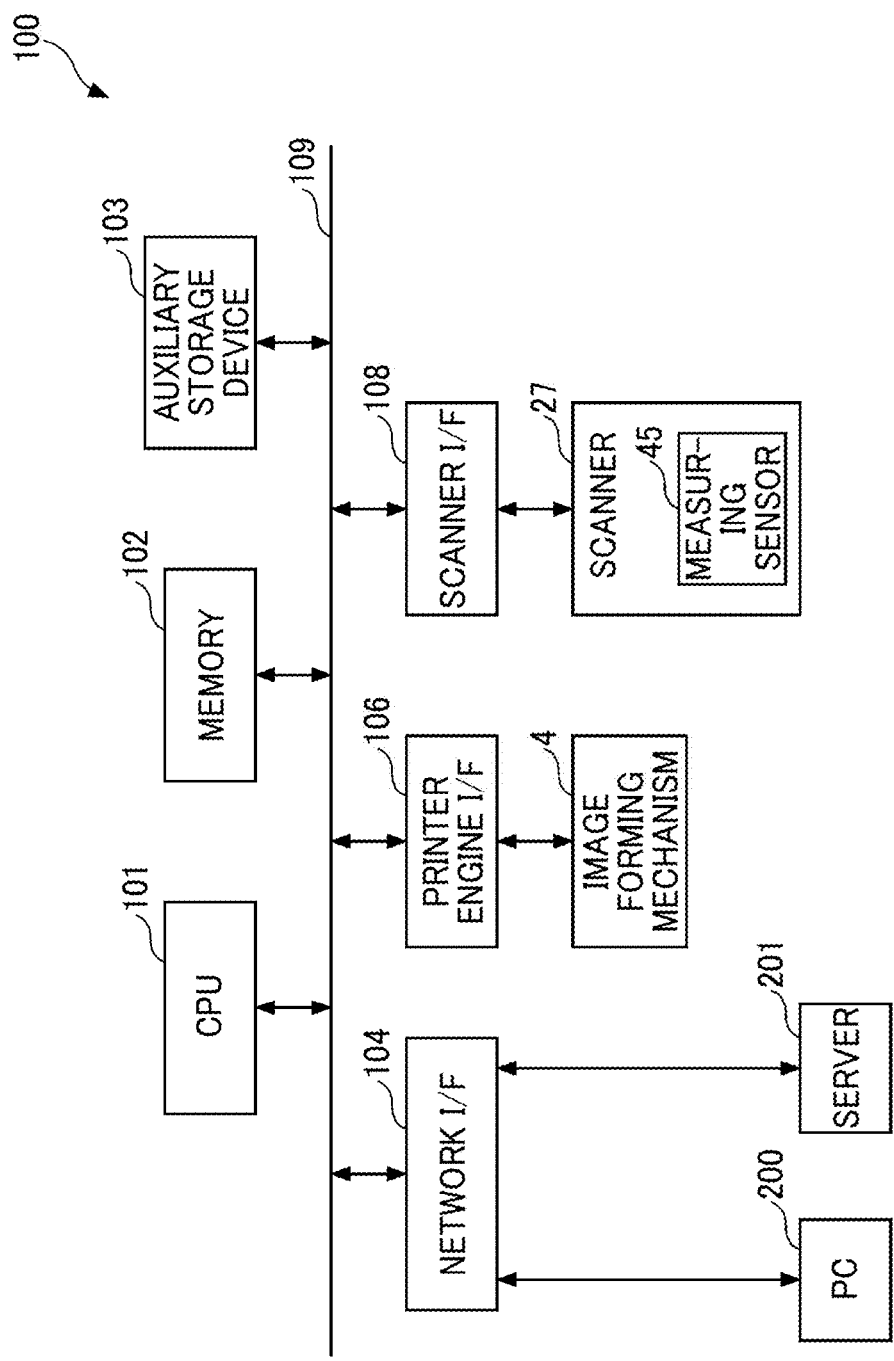
FIG. 3 is a block diagram illustrating an example of a hardware configuration of the image forming apparatus, according to an embodiment of the present disclosure.

FIG. 3 is a block diagram illustrating an example of a hardware configuration of the image forming apparatus 100.

The image forming apparatus 100 includes a central processing unit (CPU) 101, a memory 102, an auxiliary storage device 103, a network interface (I/F) 104, a printer engine I/F 106, the image forming mechanism 4, and a scanner 27. The CPU 101, the memory 102, the auxiliary storage device 103, the network I/F 104, the printer engine I/F 106, and the scanner I'F 108 are connected to each other via a bus 109 so as to perform data communication with each other.

The CPU 101 is an arithmetic that comprehensively controls operation of the image forming apparatus 100.

The memory 102 includes a read only memory (ROM), which stores programs such as firmware, and a random access memory (RAM), which is used as a work area during arithmetic processing by the CPU 101.

The auxiliary storage device 103 is a storage device such as a hard disk drive (HDD), a solid state drive (SSD), or a flash memory, which stores, for example, an operating system (OS), various programs, original data, and a color profile.

The network I/F 104 is an interface that allows the devices of the image forming apparatus 100 to communicate with an external device via the communication network 500. The network I/F 104, supports, for example, Ethernet® or supports, for example, communication standards of Transmission Control Protocol (TCP)/Internet Protocol (IP). The devices of the image forming apparatus 100 can communicate data with external devices such as the user terminal 200 and the server 201 via the network I/F 104.

The printer engine I/F 106 is an interface that allows the devices of the image forming apparatus 100 to communicate with the image forming mechanism 4.

The scanner I/F 108 is an interface that allows the devices of the image forming apparatus 100 to communicate with the scanner 27. The scanner 27 is a device that reads an image on the sheet P using functions of the measuring sensor 45.

Note that the hardware configuration of the image forming apparatus 100 illustrated in FIG. 3 is merely an example. In another example, the image forming apparatus 100 includes other components in addition to the components illustrated in FIG. 3.

Figure 4:
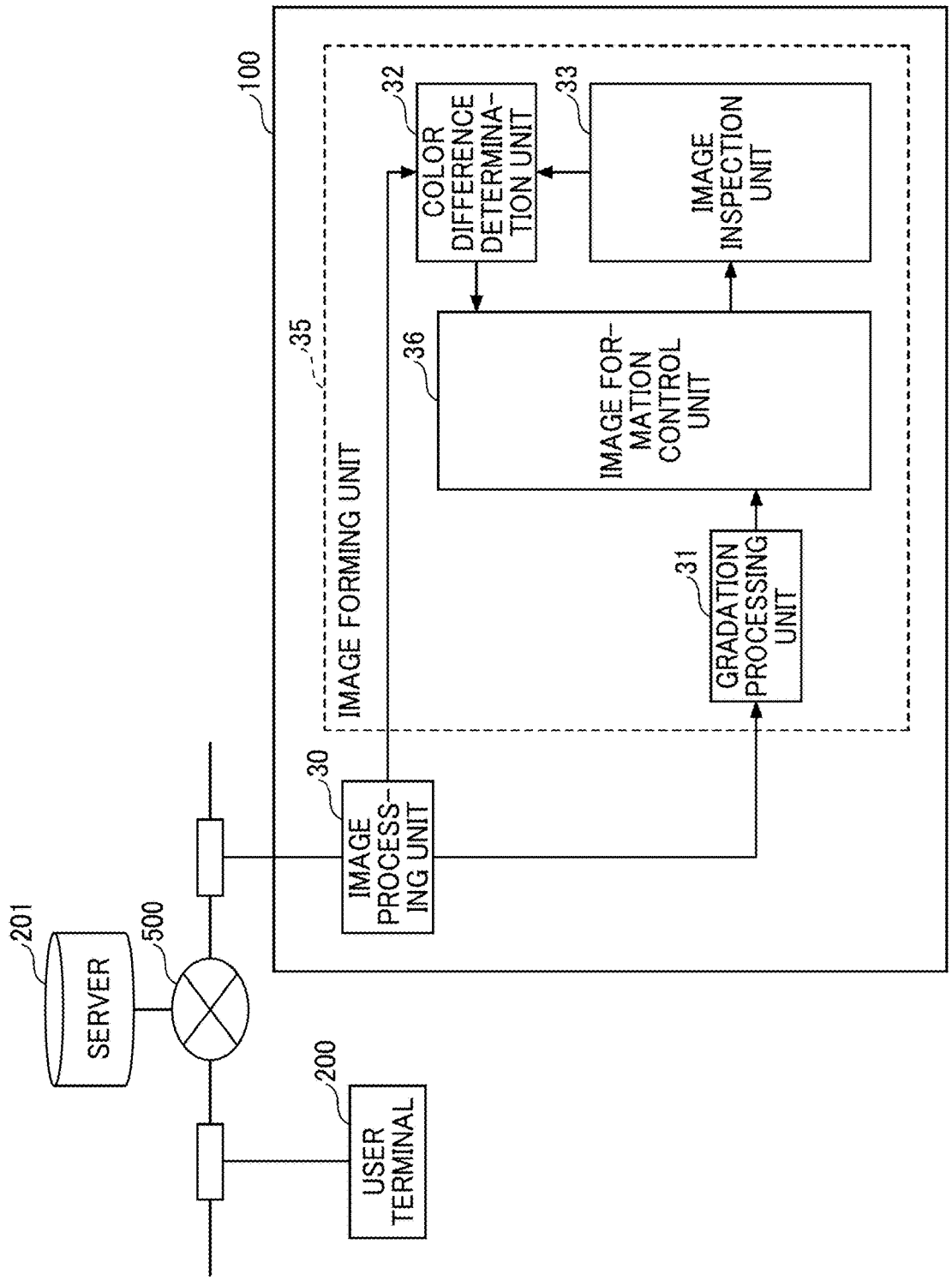
FIG. 4 is a block diagram illustrating an example of a functional configuration of the image forming apparatus, according to an embodiment of the present disclosure.

FIG. 4 is a block diagram illustrating an example of a functional configuration of the image forming apparatus 100.

The image forming apparatus 100 includes an image processing unit 30 and an image forming unit 35.

The image processing unit 30 performs image processing of converting original data received from the user terminal 200 or the server 201 via the communication network 500 into a format printable by the image forming mechanism 4. The original data is data expressed in a data format including, for example, bitmap data designated in colors of red, green, and blue (RGB) or cyan, magenta, yellow, and black (CMYK), text data, or a graphic drawing command.

The image processing unit 30 converts the original data on which the image processing has been performed into image data having a pixel array (bitmap data or an equivalent compression format) constructed of the basic colors of the image forming mechanism 4. The image processing unit 30 sends the converted image data to a gradation processing unit 31.

The image processing unit 30 is implemented by hardware including dedicated software and an expansion board. The hardware implementing the image processing unit 30 is independent of hardware implementing the image forming unit 35. With this configuration, the hardware implementing the image processing unit 30 is replaceable independently from the hardware implementing the image forming unit 35.

In another example, the image processing unit 30 is implemented by a tei final external to the image forming apparatus 100, provided that the image processing unit is communicable with hardware implementing the image forming unit 35. For example, the image processing unit 30 may be implemented by the user terminal 200 or the server 201. In another example, the image processing unit 30 is implemented by hardware implementing the image forming unit 35.

The image forming unit 35 includes the gradation processing unit 31, a color difference determination unit 32, an image inspection unit 33, and an image formation control unit 36.

The gradation processing unit 31 converts the image data converted by the image processing unit 30 and having the pixel array into image data having the number of gradations expressible by the image forming mechanism 4.

The image inspection unit 33 detects (reads) an image from the sheet P printed out by the image forming mechanism 4 by using the scanner 27 in an in-line format. Specifically, the image inspection unit 33 detects an image by controlling the measuring sensor 45 of the scanner 27. The measuring sensor 45 emits light to an image formed by the image forming mechanism 4 and receives the reflected light, to two-dimensionally measure reflectance of the image on a surface and detect the reflectance as an image. In other words, detecting an image means measuring colors of the image. The measuring of colors of the image may be referred to as "colorimetry" in the following description. Details of operation by the image inspection unit 33 are described below.

The color difference determination unit 32 calculates a color difference by comparing colors of the image detected by the image inspection unit 33 for each copy. Specifically, the color difference determination unit 32 calculates the color difference between a color of an image of a first copy as a reference of printing job data and a color of an image of an n-th copy. In a case that the calculated color difference exceeds a preset threshold value, the color difference determination unit 32 sends a notification to the image formation control unit 36. Details of operation by the color difference determination unit 32 are described below.

The image formation control unit 36 controls image formation by the image forming mechanism 4. The image formation control unit 36 controls the image forming mechanism 4 to print an image on the sheet P according to the image data converted by the gradation processing unit 31. Further, in response to receiving the notification, the image formation control unit 36 suspends printing and waits for a user's instruction. In response to receiving an instruction to resume printing from the user, the image formation control unit 36 resumes printing.

Each of the gradation processing unit 31, the color difference determination unit 32, the image inspection unit 33, and the image formation control unit 36 is implemented by the CPU 101 executing processing defined by the program expanded to the memory 102. In another example, a part or all of the functions of the gradation processing unit 31, the color difference determination unit 32, the image inspection unit 33 (excluding the scanner 27), and the image formation control unit 36 are implemented by a hardware circuit such as a field-programmable gate array (FPGA) or an application specific integrated circuit (ASIC).

Figure 5:
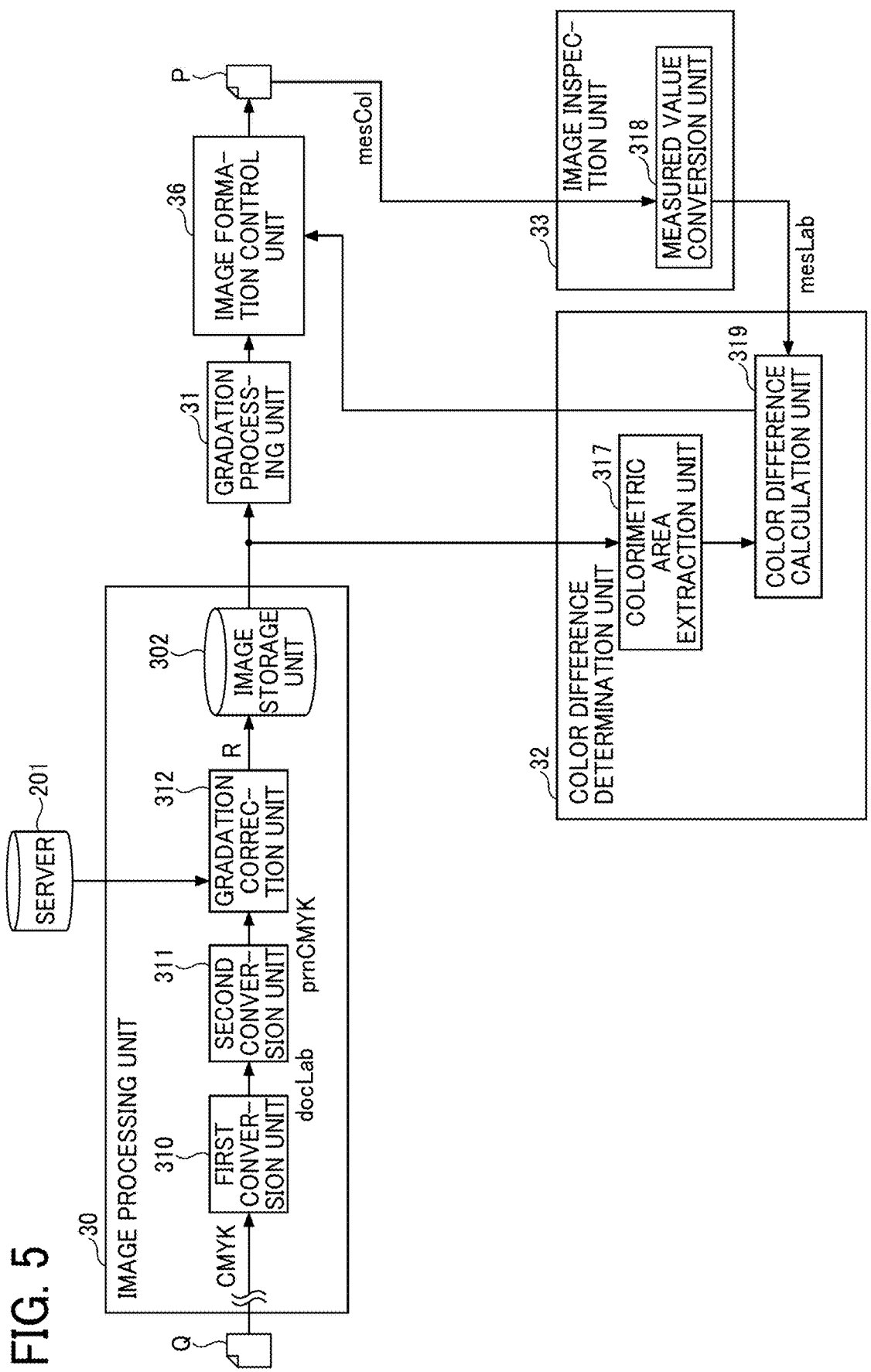
FIG. 5 is a diagram illustrating an example of details of functions of the image forming apparatus, according to a first embodiment.

FIG. 5 is a diagram illustrating an example of details of functions of the image forming apparatus 100 according to the first embodiment.

The image processing unit 30 includes a first conversion unit 310, a second conversion unit 311, a gradation correction unit 312, and an image storage unit 302.

The first conversion unit 310 converts original data Q into a Lab format. The second conversion unit 311 converts the Lab format into a CMYK format. The gradation correction unit 312 corrects gradation on the basis of a selected color profile. The data whose gradation is corrected may be referred to as "image data R" in the following description.

The image storage unit 302 stores various data including the generated image data R temporarily or continuously during image formation.

The image inspection unit 33 calculates a colorimetric value mesLab on the basis of a measured value mesCol measured by the measuring sensor 45. In other words, the image inspection unit 33 includes a measured value conversion unit 318 that converts the measured value mesCol into the colorimetric value mesLab.

The color difference determination unit 32 calculates a color difference between the first page and the subsequent second page on the basis of a result of color measurement in an extracted colorimetric area, to determine whether to continue printing on the basis of the calculated color difference. The first page and the second page are pages different from each other included in a printing job.

In one example, in a case that the printing job includes multiple copies, the first page and the second page are pages of the same page number included in different copies.

For example, the first page is a page included in the first copy of the printing job. The second page is a page whose page number is the same as the first page and included in the second or any subsequent copy of the printing job.

The color difference determination unit 32 includes a colorimetric area extraction unit 317 and a color difference calculation unit 319.

The colorimetric area extraction unit 317 extracts a colorimetric area from an area in which an image to be printed is formed.

For example, the colorimetric area extraction unit 317 analyzes a variation of gradation of an image included in the image data R, to extract, for example, an area having a small variation in gradation as an area suitable for colorimetry.

In one example, the colorimetric area extraction unit 317 extracts an area in which the variation of gradation of an image to be printed changes within, for example, a gradation halftone dot area change rate of 10% as the colorimetric area.

In another example, the colorimetric area extraction unit 317 sets an area designated according to a user's operation as the colorimetric area.

In another example, the colorimetric area extraction unit 317 sets an exclusion area designated according to user's operation as a colorimetric exclusion area. In a case that the colorimetric exclusion area is designated according to a user's operation, the colorimetric area extraction unit 317 extracts the colorimetric area from an area other than the colorimetric exclusion area in an image area of the image data R.

The color difference calculation unit 319 calculates a difference between a colorimetric value in the colorimetric area of a copy as a reference among multiple copies of a print target and a colorimetric value of a copy for which determination is to be performed, to obtain a color difference. Specifically, the color difference calculation unit 319 acquires, from the image inspection unit 33, the colorimetric value mesLab of each page included in the first copy of a printing job to be repeatedly printed and the colorimetric value mesLab of each page included in the second and subsequent copies. The color difference calculation unit 319 calculates the color difference between the acquired colorimetric values mesLab. Details of the calculation are described below.

Details of the operation by each functional unit illustrated in FIG. 5 are further described in accordance with a procedure for forming an image. The user terminal 200 or the server 201 transmits the original data Q and a printing request to the image forming apparatus 100 through the communication network 500. The original data Q has a complicated data format including a bitmap designated in colors of, for example, RGB or CMYK, text, or a drawing instruction of graphics.

The image processing unit 30 expands the received original data Q and converts the original data Q into a pixel array of basic colors of cyan C, magenta M, yellow Y, and black K that the image forming mechanism 4 includes. For example, the image processing unit 30 converts the original data Q to bitmap data in which color information of pixels are arranged in a grid pattern.

The gradation processing unit 31 converts pixels included in the bitmap data into the number of gradations expressible by the image forming mechanism 4. The image formation control unit 36 controls the image forming mechanism 4 to form an image on the sheet P according to the image data R obtained by converting the number of gradations by the gradation processing unit 31.

The image inspection unit 33 scans the image formed on the sheet P as described below by using reflection characteristics of the toner image detected by the measuring sensor 45. The color difference calculation unit 319 calculates a color difference between the colorimetric value mesLab of the first copy in the colorimetric area extracted by the colorimetric area extraction unit 317 and the colorimetric value mesLab of the second and subsequent copies for the same page and the same area.

When the color difference between the colorimetric values exceeds a preset threshold value, the color difference determination unit 32 instructs the image formation control unit 36 to suspend printing. The image forming apparatus 100 displays a message that prompts a user to select whether to stop or continue printing on an operation screen or the like, and stops or continues printing according to an operation by the user.

The description given above is an example in which a format handled by the color difference determination unit 32 is a Lab (CIELab) format and the image processing unit 30 converts the original data Q, which is color data in a CMYK format, into the Lab format. However, the Lab format is merely an example. In another example, any suitable color expression format can be used, provided that a color variation amount of the color change amount is clarified in the format.

The first conversion unit 310, the second conversion unit 311, and the measured value conversion unit 318 require basic data called a color profile for the respective color space conversions. Among these color profiles, a color profile attached to the original data Q or prepared in advance is used as a color profile for conversion from a color of the original to the Lab value. A color profile used by the measured value conversion unit 318 is set in advance in the image inspection unit 33.

It is preferable that the color profile used by the second conversion unit 311 is set by selecting an appropriate color profile suitable for the type of the sheet P from a plurality of color profiles stored in advance in the server 201 because color reproduction characteristics are affected by the type of the sheet P.

In one example, the image processing unit 30 changes the color profile according to the type of the sheet P according to a selection operation by a user. In another example, the image processing unit 30 changes the color profile according to the type of the sheet P according to selection of the sheet P suitable for the input original data Q.

For example, the image processing unit 30 uses, as a such a color profile, an International Color Consortium (ICC) profile defined by the ICC.

An operation performed by the image forming apparatus 100 is described with reference to drawings.

Figure 6:
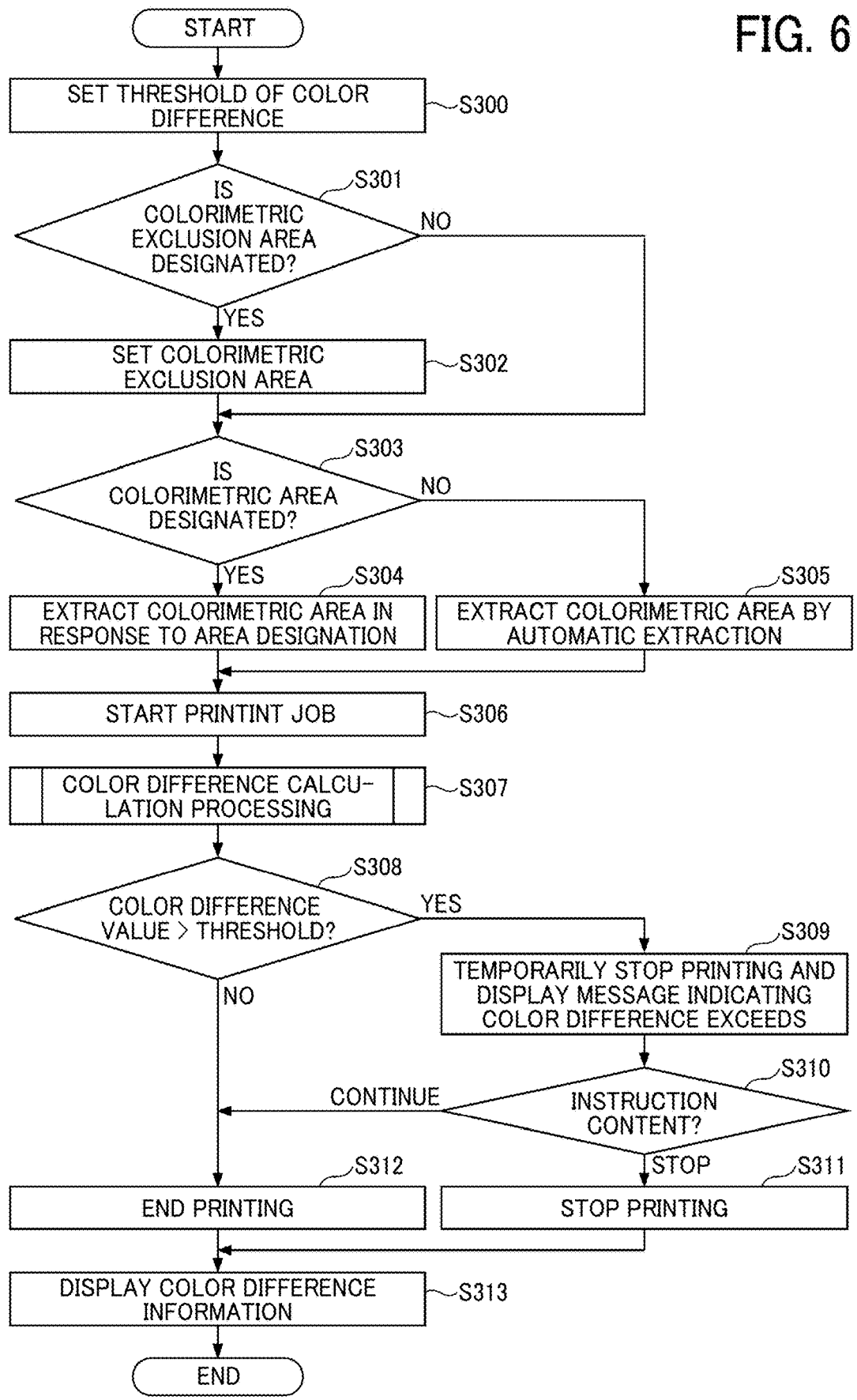
FIG. 6 is a flowchart of an example of color stabilization processing according to the first embodiment.

FIG. 6 is a flowchart of an example of color stabilization processing according to the first embodiment. In response to an operation by a user, the image forming apparatus 100 receives a setting of a threshold value of a color difference, the threshold value being used for performing color difference determination (step S300). For example, in a case that the image forming apparatus 100 performs determination on colorimetric values grouped by color systems, the image forming apparatus receives multiple settings of the threshold value of the color difference for respective color systems. In another example, the image forming apparatus 100 receives multiple settings of the threshold value of the color difference respectively for different areas or different pages. In another example, the image forming apparatus 100 receives a setting of the threshold value of the color difference common to areas or pages.

Next, the colorimetric area extraction unit 317 determines whether a colorimetric exclusion area has been designated according to an operation by the user (step S301). The colorimetric exclusion area is an area to be excluded from a color measurement target. The colorimetric exclusion area is designated by the user when there is a partial area for which the user does not want colorimetry to be performed on an image in a page for which the colorimetry is to be performed.

When the colorimetric area extraction unit 317 determines that the colorimetric exclusion area has been designated according to an operation by the user (step S301: YES), the colorimetric area extraction unit sets the designated area as the calorimetric exclusion area (step S302). When the calorimetric area extraction unit 317 determines that no colorimetric exclusion area has been designated according to an operation by the user (step S301: NO), the process of step S302 is skipped.

Next, the colorimetric area extraction unit 317 determines whether a colorimetric area has been designated according to an operation by the user (step S303). The colorimetric area is an area for which colorimetry is to be performed on the image in page for which colorimetry is to be performed.

In a case that there is an area for which the user wants to manage a color with attention, the user designates such an area as the colorimetric area.

When the calorimetric area extraction unit 317 determines that the calorimetric area has been designated according to an operation by the user (step S303: YES), the colorimetric area extraction unit sets the designated area as the colorimetric area (step S304).

When the colorimetric area extraction unit 317 determines that no colorimetric area has not been designated according to an operation by the user (step S303: NO), the colorimetric area extraction unit extracts the colorimetric area by automatic extraction (step S305).

Next, the image forming apparatus 100 starts a printing job (step S306). After starting the printing job, the image forming apparatus 100 performs color difference calculation processing described below (step S307). The color difference calculation processing is processing of printing an image on the sheet P, extracting the colorimetric value mesLab of each of colorimetric areas extracted from the printed image, and calculating the color difference between the first copy and the second and subsequent copies. Details of a flow of the color difference calculation processing are described below.

Next, the color difference determination unit 32 determines whether the color difference calculated in the color difference calculation processing exceeds the threshold value of color difference that is set in step S300 (step S308). When the color difference determination unit 32 determines that the color difference exceeds the threshold value of color difference (step S308: YES), the image formation control unit 36 suspends printing. Then, image forming apparatus 100 displays a screen including a message indicating that the color difference exceeds the threshold value (step S309). A specific example of the displayed screen is described below.

The image formation control unit 36 determines what instruction is input according to an operation by the user with respect to the displayed message (step S310). When the image formation control unit 36 determines that a continuation of printing is instructed (step S310: CONTINUE), the image formation control unit continues printing to complete the printing job (step S312). By contrast, when the image formation control unit 36 determines that a stop of printing is instructed (step S310: STOP), the image formation control unit stops printing (step S311).

After completion of the printing operation, the image forming apparatus 100 displays a screen indicating color difference information for each printing job on which the color difference determination has been performed (step S313). A specific example of the displayed screen is described below.

Figure 7:
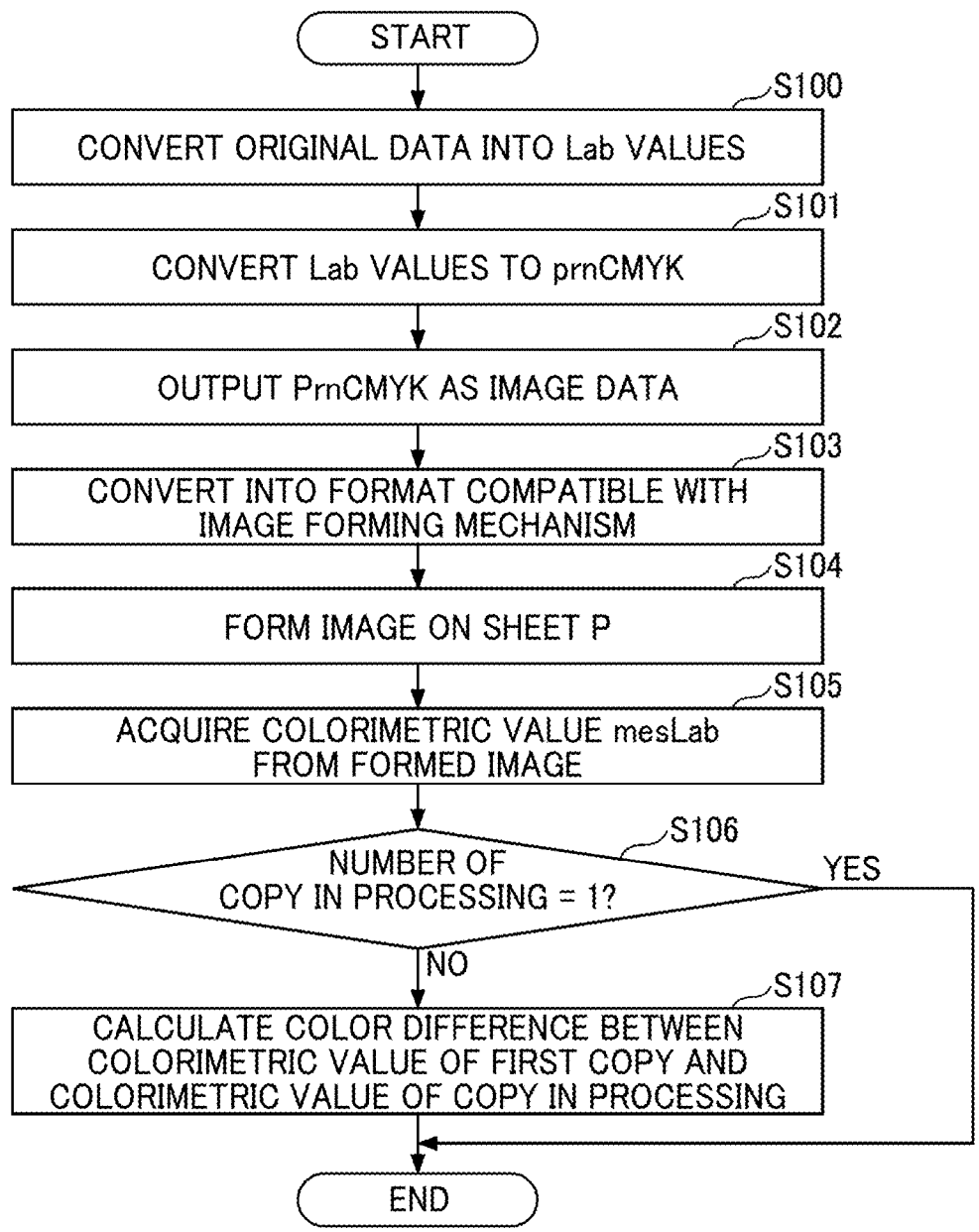
FIG. 7 is a flowchart of an example of a color difference calculation processing, according to an embodiment of the present disclosure.

FIG. 7 is a flowchart of an example of the color difference calculation processing. The image forming apparatus 100 performs the color difference calculation process in step S307 of the color stabilization processing described above with reference to FIG. 6.

In a case that the printing job includes an instruction for printing multiple copies, the image forming apparatus 100 performs processes from step S100 to step S107 described below for each of the multiple copies.

The first conversion unit 310 of the image processing unit 30 converts the received original data Q into device-independent color specification value docLab of Lab format (step S100). The original data Q is data representing colors expressed in RGB format or CMYK format.

The second conversion unit 311 converts the color specification value docLab into a gradation value pmCMYK, which is a set of 8-bit integer gradation values of colors of cyan C, magenta M, yellow Y, and black K, which are basic colors of the image forming mechanism 4 (step S101).

In the initial state, the gradation correction unit 312 outputs the gradation value pmCMYK as the image data R without any change to the gradation value (step S102). In a case that gradation correction is required as a result of the color stabilization processing, the gradation correction unit 312 may perform gradation correction based on the result of the color stabilization processing.

The processes from step S100 to step S102 is performed as vector data, fonts, and the like included in the original data Q are expanded. The image data R obtained as a result of the processes is bitmap data for four colors of the basic colors cyan, magenta, yellow, and black obtained by quantizing the color information of the original data Q. The image data R that is output is stored in the image storage unit 302 of the image processing unit 30 for each document used for printing.

Next, the gradation processing unit 31 converts the color value sent in, for example, 8 bits for each of the basic colors, by using area coverage modulation or error diffusion so that the color value corresponds to the number of gradations expressible by the image forming mechanism 4 (step S103). The image formation control unit 36 controls the image forming mechanism 4 to form a toner image according to the output image data P and transfer the formed toner image onto the sheet P by the transfer device 5 (step S104).

The toner image formed by the image formation control unit 36 is transferred onto the sheet P by the transfer device 5 and then scanned using reflection characteristics of the toner image measured by the measuring sensor 45. The image inspection unit 33 measures a color of the scanned image and inputs a value obtained by measuring the color to the measured value conversion unit 318 as the measured value mesCol. The measured value conversion unit 318 converts the input measured value mesCol into a Lab value to obtain the lab-valued colorimetric value mesLab (step S105).

The image forming apparatus 100 determines whether a copy being processed is the first copy (step S106). When the image forming apparatus 100 determines that the copy being processed is the first copy (step S106: YES), the image forming apparatus stores the colorimetric value mesLab as a reference for comparison, and ends the color stabilization processing.

By contrast, when the image forming apparatus 100 determines that the copy being processed is not the first copy (step S106: NO), the color difference calculation unit 319 calculates a color difference between the colorimetric value of the first copy and the colorimetric value of the copy being processed (step S107).

A method of extracting the colorimetric area is described with reference to the drawings.

Figure 8:
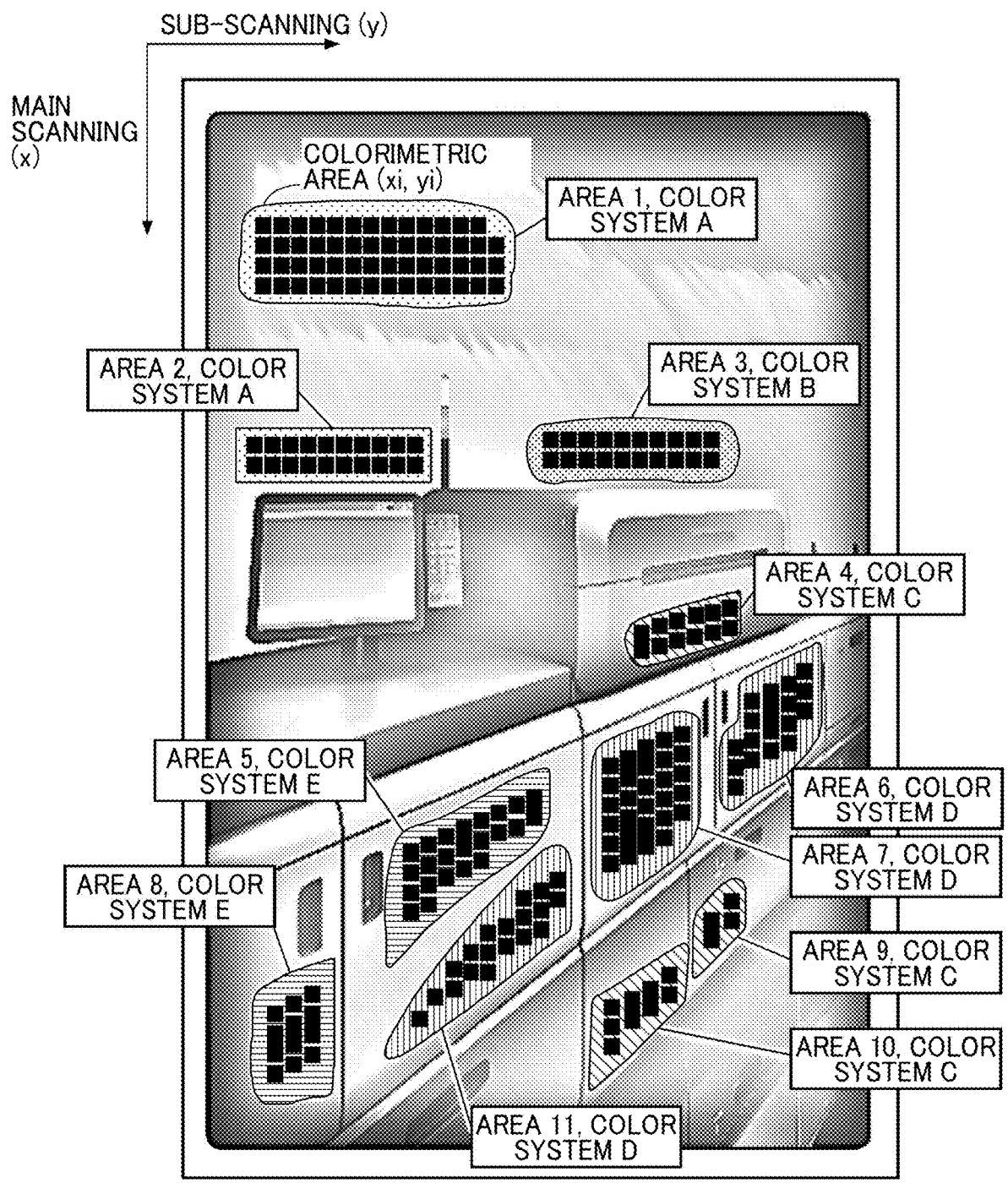
FIG. 8 is a diagram for describing extraction of a colorimetric area, according to an embodiment of the present disclosure.

FIG. 8 is a diagram for describing extraction of the colorimetric area.

The colorimetric area extraction unit 317 extracts the colorimetric area by automatic extraction in step S305 of the color stabilization processing described above with reference to FIG. 6. FIG. 8 illustrates an example of how to extract colorimetric areas from the image data R, and illustrates colorimetric areas extracted from a print area of the same color system. Black squares in the drawing indicate N colorimetric areas (xi, yi) (i=1, N) automatically extracted from the print area by the colorimetric area extraction unit 317. Each of the colorimetric areas is a colorimetric area whose size is about several millimeters square suitable for colorimetry, and is arranged in an area where a variation in color gradation on the image to be formed is small. In the following description, a position of each of the colorimetric areas is represented by coordinates (x, y) of the center of the colorimetric area.

In the description of the present embodiment, a sheet feeding direction in which the sheet P is conveyed in the image forming apparatus 100, in other words, a so-called sub-scanning direction is indicated by the coordinate y. A direction orthogonal to the sub-scanning direction, in other words, a main-scanning direction is indicated by the coordinate x.

Further, the size of one colorimetric area is, for example, an area having a pixel area specified in advance, such as an area of about 5 millimeters square, i.e., 41×41 pixels in terms of 400 dots per inch (dpi). However, for example, in a case that an area suitable for colorimetry is smaller than the pixel area specified in advance, the colorimetric area extraction unit 317 extracts an area having a smaller pixel area as a colorimetric area.

For example, when the colorimetric area extraction unit 317 determines that the area suitable for colorimetry is smaller than about 5 millimeters square, the colorimetric area extraction unit may extract an area of 21×21 pixels as one of the colorimetric areas. With this configuration, an appropriate amount of color variation that is less affected by a color variation due to a difference in color gradation on an image is obtained.

The colorimetric area extraction unit 317 extracts N colorimetric areas Ref (xi, yi) from a first copy, which is a copy to be printed first in a printing job including a single page or several consecutive pages. The color difference calculation unit 319 stores the colorimetric values mesLab of the N colorimetric areas Ref (xi, yi) as reference values $mesLab_{Ref\,(xi,\,yi)}$.

Further, the color difference calculation unit 319 acquires, for each of the second copy and subsequent copies of the printing job according to which printing is continuously performed repeatedly, a colorimetric value $mesLab_{Dif\,(nc)\,(xi,\,yi)}$ of Dif (nc) (xi, yi), which is a colorimetric area at the same position on a page of the same number as the colorimetric area Ref (xi, yi), where nc indicates a copy number.

The color difference calculation unit 319 calculates a color difference ΔLab (nc) (xi, yi) by applying the N colorimetric values $mesLab_{Dif\,(nc)\,(xi,\,yi)}$ and the N reference values $mesLab_{Ref\,(xi,\,yi)}$ acquired for each pf the copies to the following Equation (1).

$$\Delta Lab(nc)(xi,yi)=mesLab_{Dif(nc)(xi,yi)}-meSLab_{Ref(xi,yi)} \quad \text{Equation (1)}$$

Further, the color difference determination unit 32 determines whether the calculated color difference ΔLab (nc) (xi, yi) exceeds a preset threshold value of color difference.

In one example, the color difference determination unit 32 organizes the color differences ΔLab (nc) (xi, yi) calculated respectively for the colorimetric areas by classifying the color differences by Areas 1 to 11 as illustrated in FIG. 8 and performs the determination on the basis of a color difference calculated according to a mean value of the colorimetric values $mesLab_{Dif\,(nc)\,(xi,\,yi)}$ for the Areas and a mean value of the reference value $mesLab_{Ref\,(xi,\,yi)}$ for the Areas.

In another example, the color difference determination unit 32 performs the classification by color systems (e.g., color systems A to E in the Figure) such as blue, red, green, and gray, in a low density range, a high density range, and an intermediate range of the low density range and the high density range and performs the determination on the basis of a color difference calculated according to a mean value of the colorimetric values $mesLab_{Dif(nc)\,(xi,\,yi)}$ and a mean value of the reference values $mesLab_{Ref\,(xi,\,yi)}$ organized respectively for the color systems.

This enables the color difference determination based on the areas or the color systems. Further, with this configuration, color variation in neighboring areas or the same color system are smoothed. Accordingly, for example, a deviation error of variation due to density unevenness in a page that occurs during image forming processing is reduced, and more accurate color difference determination is achieved. In another example, the color difference determination unit 32 organizes the colorimetric values $mesLab_{Dif\,(nc)\,(xi,\,yi)}$ and the reference values $mesLab_{Ref\,(xi,\,yi)}$ for each page and performs the determination on the basis of a color difference calculated according to a mean value of the colorimetric values $mesLab_{Ref\,(nc)\,(xi,\,yi)}$ organized for each page and a mean value of the reference values $mesLab_{Ref\,(xi,\,yi)}$ organized for each page. This enables the color difference determination between the same pages.

In another example, the color difference calculation unit 319 calculates a color difference ΔE value on the basis of a calculation formula defined by the Commission Internationale de l'Eclairage (CIE) according to the color difference ΔLab (nc) (xi, yi). In this case, the color difference determination unit 32 performs the determination on the basis of the calculated color difference ΔE.

Figure 9:
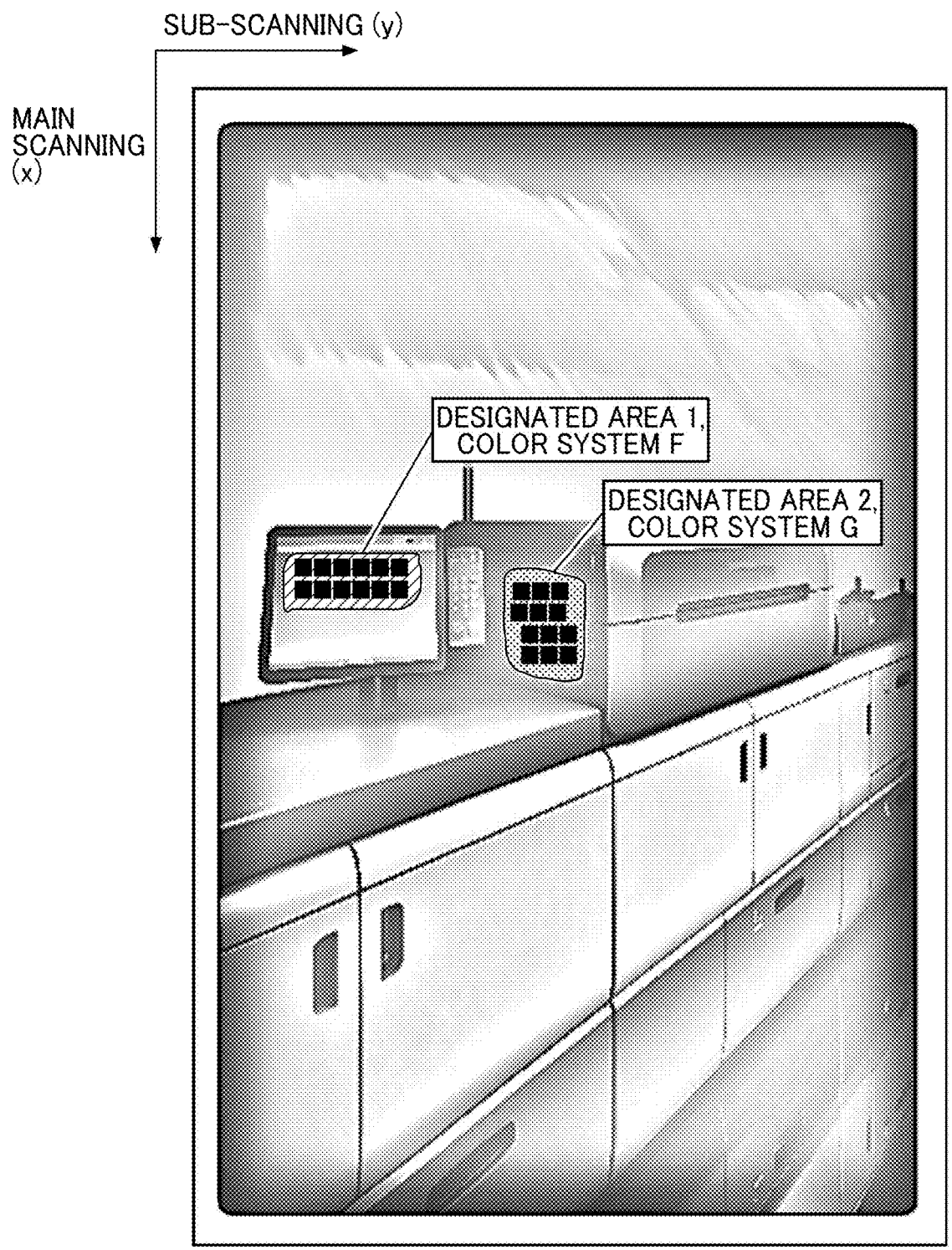
FIG. 9 is a diagram for describing designation of the colorimetric area, according to an embodiment of the present disclosure.
Figure 10:
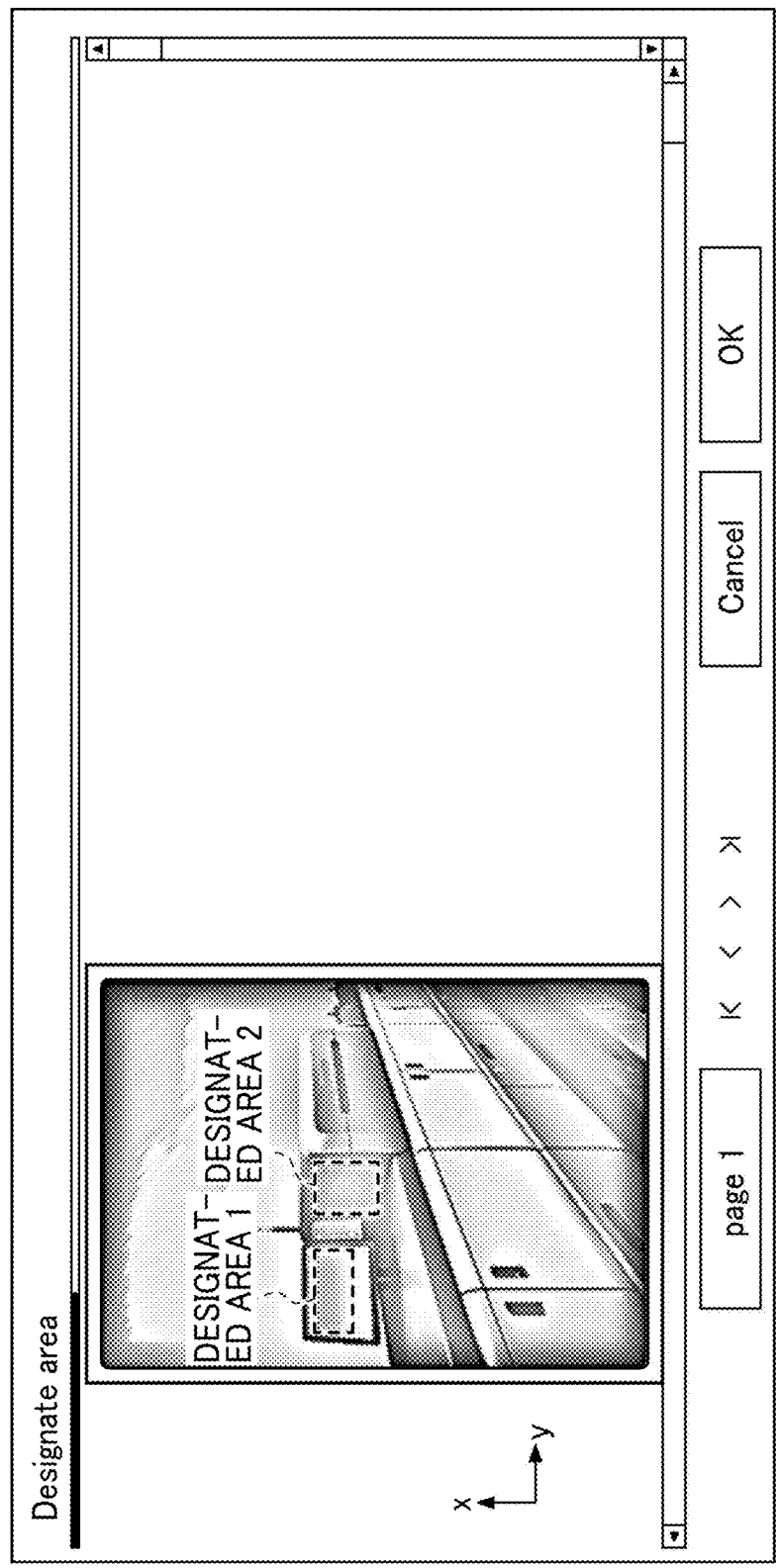
FIG. 10 is an illustration of an example of a colorimetric area designation screen, according to an embodiment of the present disclosure.

FIG. 9 is a diagram for describing the designation of the colorimetric area. FIG. 10 is an illustration of an example of a colorimetric area designation screen.

FIG. 9 is a diagram illustrating an example in which the colorimetric area extraction unit 317 extracts areas designated by a user, while FIG. 8 illustrates an example in which the colorimetric area extraction unit extracts the colorimetric areas by automatic extraction. For example, a user designates an area for which the user wants to manage a color with attention. Color difference determination based on a colorimetric value of the designated area is implemented.

The image forming apparatus 100 displays the colorimetric area designation screen as illustrated in FIG. 10 on a monitor, for example. The user designates an area by surrounding the area with a rectangular frame that includes the area to be designated by using a mouse or the like used for operating a computer. Although FIG. 10 illustrates an example in which two designated areas, i.e., a designated area 1 and a designated area 2 illustrated in FIG. 9 are designated, this is merely an example. In another example, one or three or more areas are designated on the calorimetric area designation screen.

In one example, on the colorimetric area designation screen, information on an area that is already designated is erased, and a new area is designated. This makes it easy to deal with a case where the user erroneously designates an area or a case where an area for which color management is to be performed is changed.

Coordinate information of each of the designated areas is sent to the colorimetric area extraction unit 317. The colorimetric area extraction unit 317 extracts the colorimetric area on the basis of the sent coordinate information. The color difference determination unit 32 performs color difference determination on the basis of the colorimetric value acquired for the extracted colorimetric area.

This configuration allows the user to designate an area for which the user wants to manage a color with attention. Thus, the color difference determination based on a colorimetric value of the designated area is implemented.

In one example, the color difference determination unit 32 organizes the color differences ΔLab (nc) (xi, yi) calculated respectively for the colorimetric areas by classifying the color differences by the designated areas and performs the determination on the basis of a color difference calculated according to a mean value of the colorimetric values mesLab$_{Dif\,(nc)\,(xi,\,yi)}$ for the designated areas and a mean value of the reference value mesLab$_{Ref\,(xi,\,yi)}$ for the designated areas. In another example, the color difference determination unit 32 performs the classification by color systems and performs the determination on the basis of a color difference calculated according to a mean value of the colorimetric values mesLab$_{Dif\,(nc)\,(xi,\,yi)}$ and a mean value of the reference values mesLab$_{Ref\,(xi,\,yi)}$ organized respectively for the color systems. In another example, in order to perform the color difference determination for each unit of the same page, the color difference determination unit 32 organizes the colorimetric values mesLab$_{Dif\,(nc)\,(xi,\,yi)}$ and the reference values mesLab$_{Ref\,(xi,\,yi)}$ for each page and performs the determination on the basis of a color difference calculated according to a mean value of the colorimetric values mesLab$_{Dif\,(nc)\,(xi,\,yi)}$ organized for each page and a mean valued of the reference values mesLab$_{Ref\,(xi,\,yi)}$ organized for each page.

In another example, the color difference determination unit 32 calculates a color difference ΔE value on the basis of a calculation formula defined by the CIE according to the color difference ΔLab (nc) (xi, yi) and performs the determination on the basis of the calculated color difference ΔE.

In one example, the colorimetric area extraction unit 317 extracts one or more colorimetric areas obtained by combining the designated area as illustrated in FIG. 9 and the automatically extracted area as illustrated in FIG. 8. In a case that the designated area is included in a certain color system of the automatically extracted area, the color difference calculation unit 319 may calculate the color difference by organizing the colorimetric values in the same color system.

In another example, the colorimetric area extraction unit 317 stores information on an area designated in a printing job, calls the stored information on the designated area, and reuses the called information on the designated area when the same printing job is executed again after a certain period of time. This enables color difference evaluation of the same area in the same printing job at the time of reprinting.

Figure 11:
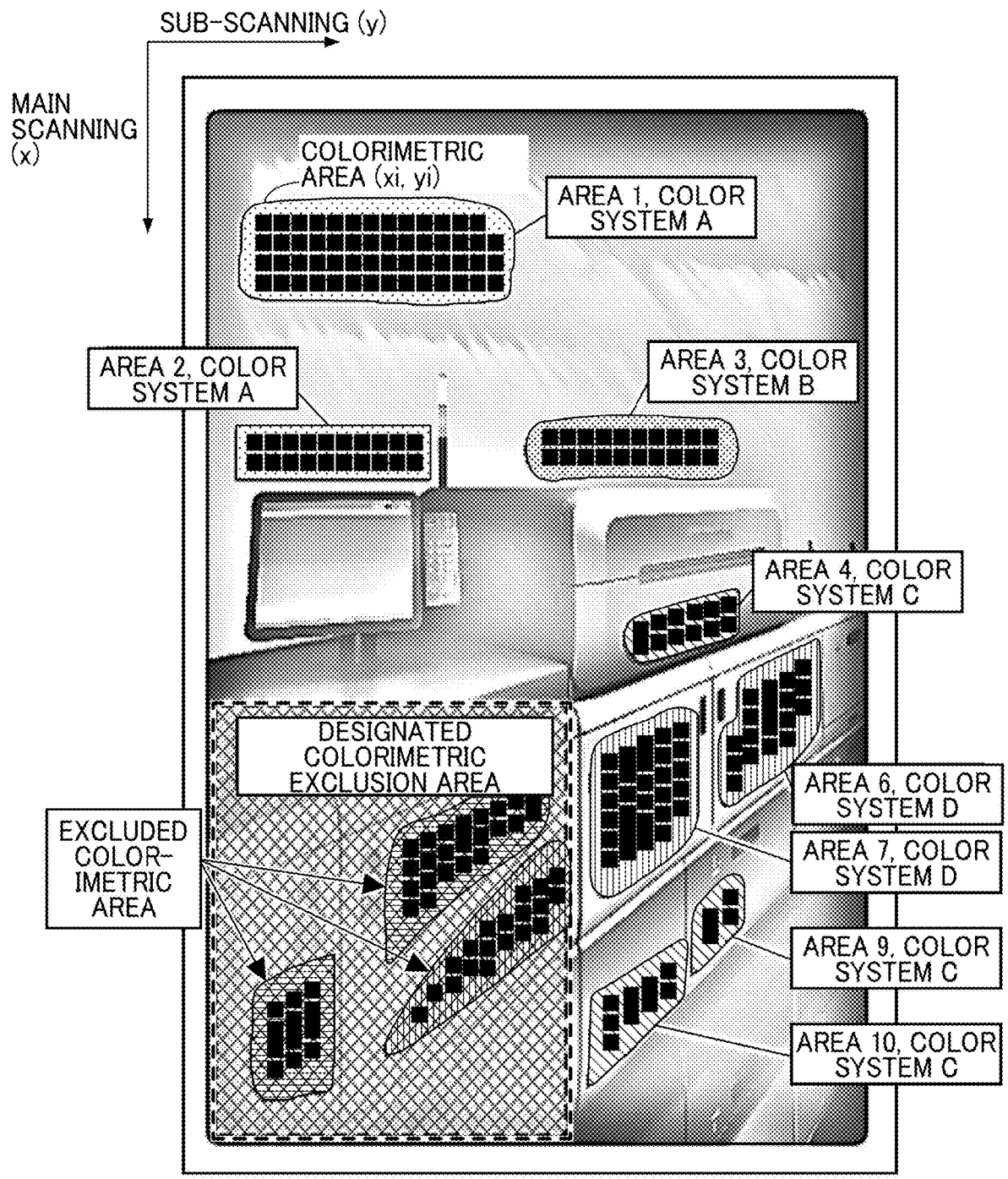
FIG. 11 is a diagram for describing designation of a colorimetric exclusion area, according to an embodiment of the present disclosure.
Figure 12:
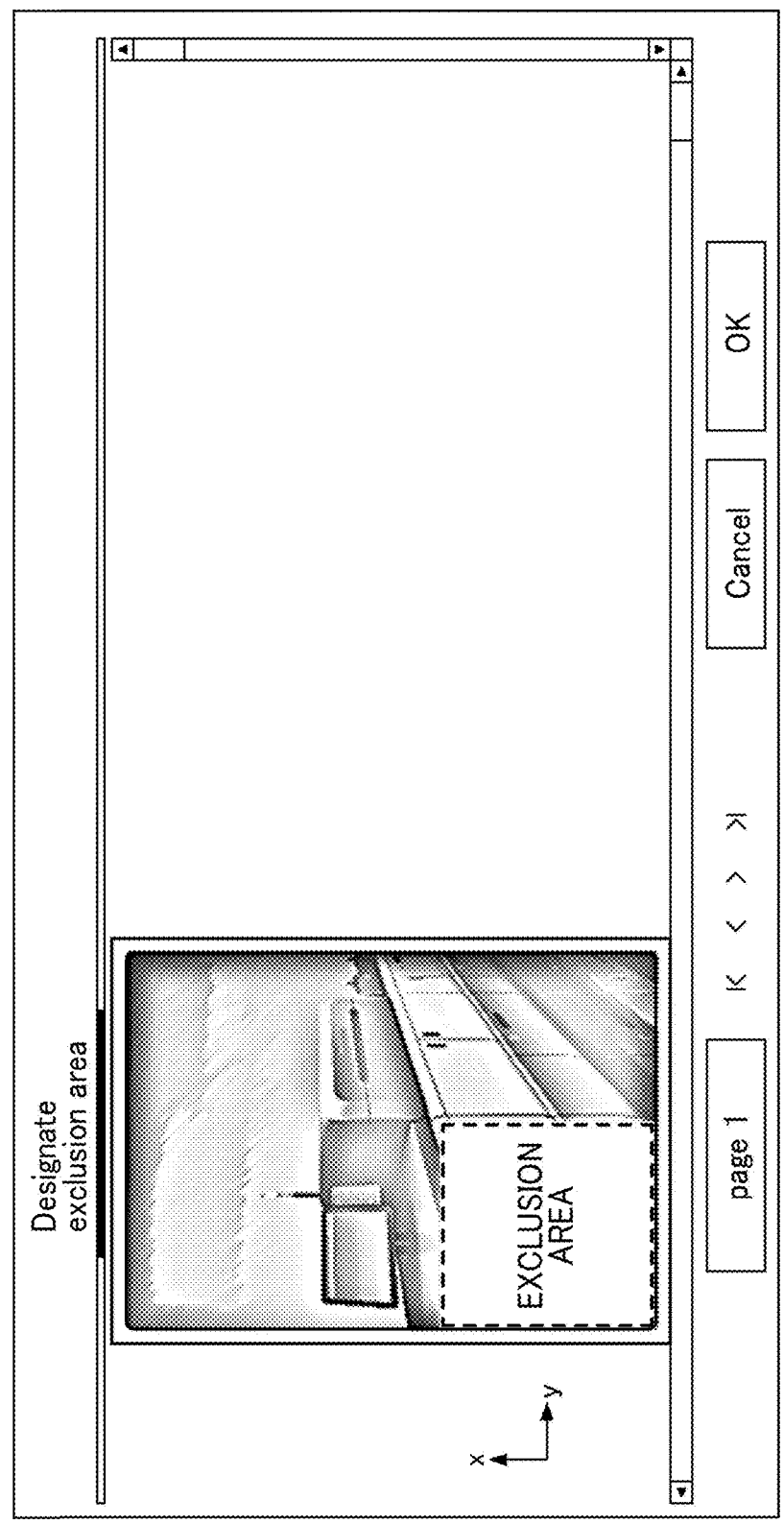
FIG. 12 is an illustration of an example of a colorimetric exclusion area designation screen, according to an embodiment of the present disclosure.

FIG. 11 is a diagram for describing designation of the colorimetric exclusion area. FIG. 12 is an illustration of an example of a colorimetric exclusion area designation screen.

FIG. 11 is a diagram illustrating an example in which a user designates an area for which the user does not want colorimetry to be performed as an exclusion area, in a case that the user does not want colorimetry to be performed on a partial area on an image in a page for which colorimetry is to be performed.

Variable data printing is a form of printing in which different text or different image are inserted into a desired partial area in a page from one print copy to another print copy, when multiple copies are continuously printed according to a printing job. When different text or different images are inserted for copies of the repeated printing, color configurations of areas into which the different text or different images are inserted are likely to vary, and such areas may be unsuitable for color management. For this reason, it is desirable to exclude an area into which different text or image are inserted from the colorimetric area.

To address the above-described issue, the image forming apparatus 100 displays the colorimetric exclusion area designation screen as illustrated in FIG. 12 on a monitor, for example. The user designates an area that the user wants to exclude from colorimetry by surrounding the area with a rectangular frame by using a mouse or the like used for operating a computer. Although FIG. 12 illustrates an example in which one exclusion illustrated in FIG. 11 is designated, this is merely an example. In another example, one or three or more areas are designated on the colorimetric exclusion area designation screen.

In one example, on the colorimetric exclusion area designation screen, information on an area that is already designated is erased, and a new area is designated. This makes it easy to deal with a case where the user erroneously designates an area or a case where an area for which the user does not want color management to be performed is changed.

Coordinate information of each of the designated areas is sent to the colorimetric area extraction unit 317. The colorimetric area extraction unit 317 extracts an area other than the colorimetric exclusion area as a colorimetric area on the basis of the sent coordinate information. The color difference determination unit 32 performs color difference determination on the basis of the colorimetric value acquired for the extracted colorimetric area.

With this configuration, in a case that different image information is inserted from one copy to another copy that are continuously printed, color difference determination is performed on the basis of colorimetry excluding a colorimetric area included in an area into which the different image information is inserted.

In another example, the colorimetric area extraction unit 317 stores information on the exclusion area designated in a printing job, calls the stored information on the exclusion area, and reuses the called information on the exclusion area when the same printing job is executed again after a certain period of time. This enables color difference evaluation excluding the same area in the same printing job at the time of reprinting.

In another example, the colorimetric area extraction unit 317 receives at least one of designation of the exclusion area and designation of a colorimetric area to be added according to a user's operation based on the automatically extracted colorimetric area, and sets an area changed on the basis of the received designation as the colorimetric area.

Figure 13:
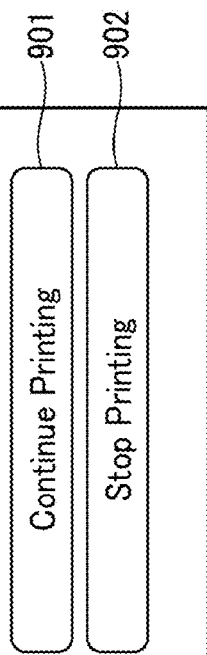
FIG. 13 is an illustration of an example of a color difference excess message display screen, according to an embodiment of the present disclosure.

FIG. 13 is an illustration of an example of a color difference excess message display screen.

In step S309 of the color stabilization processing described above with reference to FIG. 6, the image forming apparatus 100 displays a screen (the color difference excess message display screen) including a message indicating that a color difference exceeds the threshold value of color difference.

The color difference excess message display screen includes a print continuation button 901 and a print stop button 902.

In response to pressing of the print continuation button 901 by a user, the image formation control unit 36 determines that the continuation of printing is instructed in the determination of step S310 in the color stabilization processing described with reference to FIG. 6. According to the determination, the image formation control unit 36 continues printing to complete the printing job.

By contrast, in response to pressing of the print stop button 902 by a user, the image formation control unit 36 determines that the stop of printing is instructed in the determination of step S310 in the color stabilization processing described with reference to FIG. 6 and stops printing.

FIG. 14 is an illustration of an example of a color difference information display screen.

In step S313 of the color stabilization processing described with reference to FIG. 6, after completion of the printing operation, the image forming apparatus 100 displays a screen (the color difference information display screen) indicating color difference information for each printing job on which the color difference determination has been performed. On the color difference information display screen, a data protection button 911, a delete button 912, and a data check button 913 are displayed for each printing job.

The data protection button 911 is a graphical user interface (GUI) for displaying color difference information for each printing job for which the color difference determination has been performed and protecting the color difference information for a certain time period. During a time period when the data protection button 911 is ON (protection active), the color difference information of the corresponding printing job is protected from being deleted.

The delete button 912 is a GUI for deleting the color difference information. When the delete button 912 is pressed, the image forming apparatus 100 deletes the color difference information of the corresponding printing job.

The data check button 913 is a GUI for checking details of the color difference information. When the data check button 913 is pressed, the image forming apparatus 100 displays detailed information of the color difference information of the corresponding printing job. The detailed information includes, for example, a list of determination results for each color system and each copy, or a list of determination results for each area, each copy, or each page, with respect to the color difference determination results for each color system.

The image forming apparatus 100 according to the present embodiment extracts a colorimetric area in an image to be printed and determines color variation according to a color difference between copies of a printing job on the basis of a colorimetric value obtained by performing colorimetry on an image printed on a sheet in the extracted colorimetric area. This enhances the accuracy of an inspection of a color variation of the imaue to be printed.

In one example, the colorimetric area extraction unit 317 extracts, as the colorimetric area, an area having a small variation in gradation in the image to be printed. With this configuration, an appropriate amount of color variation that is less affected by a color variation due to a difference in color gradation on an image is obtained.

In one example, in response to receiving designation of an exclusion area to be excluded from an area for which colorimetry is to be performed in an area where an image is to be formed, the colorimetric area extraction unit 317 extracts an area other than the designated exclusion area as the colorimetric area. With this configuration, in a case that different images are inserted from one copy to another copy that are continuously printed, colorimetry is performed excluding a colorimetric area included in areas into which the different images area inserted.

In one example, in response to receiving designation of an area for which colorimetry is to be performed in an area where an image is to be formed, the colorimetric area extraction unit 317 extracts the designated area as the colorimetric area. This configuration allows a user to designate an area for which the user wants to manage a color with attention. Thus, color difference determination based on a colorimetric value of the designated area is implemented.

In one example, the colorimetric area extraction unit 317 extracts a colorimetric area in a unit of an area having a pixel area specified in advance. With this configuration, a colorimetric value of the colorimetric area is acquired by acquiring at least one color of the pixel area specified in advance in the colorimetric area.

In one example, when the colorimetric area extraction unit 317 determines that an area having a small variation in gradation in an image to be printed does not have the pixel area specified in advance, the colorimetric area extraction unit 317 extracts the colorimetric area in a unit of an area smaller than the pixel area. With this configuration, an appropriate amount of color variation that is less affected by a color variation due to a difference in color gradation on an image is obtained.

In one example, when the color difference determination unit 32 determines that a color difference exceeds a set threshold value, the image forming apparatus 100 suspends printing and display a message indicating that the color difference exceeds the threshold value. With this configuration, an operator or the like who performs a printing operation is notified that a color variation state gets worse.

In one example, the image forming apparatus 100 displays information indicating the calculated color difference. This allows a user to check a color variation state.

Second Embodiment

A description is now given of a second embodiment. In the second embodiment, a mode is described in which a colorimetric area is extracted on the basis of information indicating designation of a color by a user. In the following description of the second embodiment, differences from the first embodiment are focused. In the following description, the same reference numerals are given to the same or corresponding functions or configurations as those of the first embodiment, and the redundant descriptions are omitted or simplified appropriately.

Figure 15:
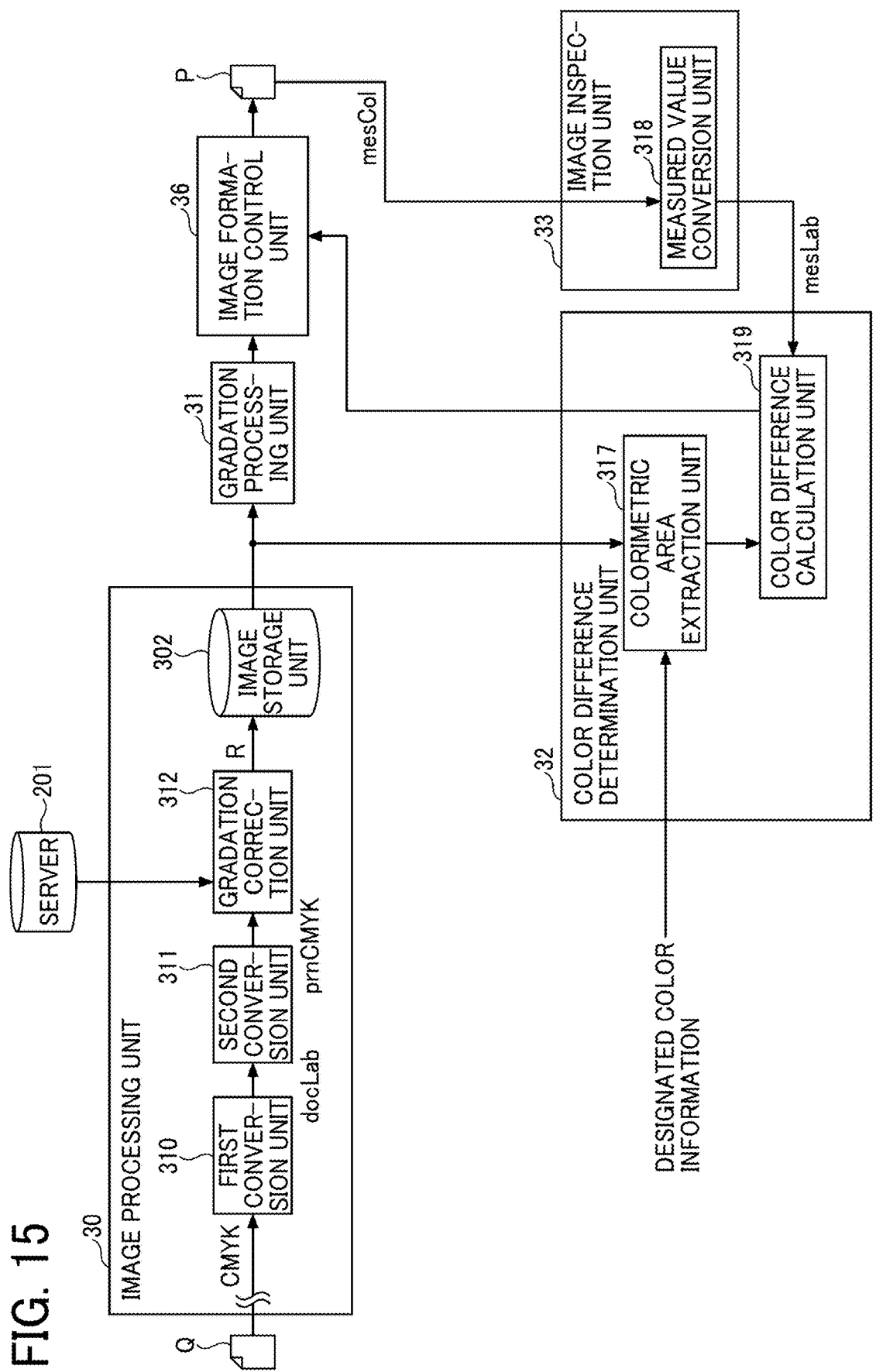
FIG. 15 is a diagram illustrating an example of details of functions of the image forming apparatus, according to the second embodiment.

FIG. 15 is a diagram illustrating an example of details of functions of the image forming apparatus 100 according to the second embodiment. In the present embodiment, in one example, the colorimetric area extraction unit 317 acquires designated color information indicating designation by a user of a color for which colorimetry is to be performed and determine a colorimetric area on the basis of the designated color. In another example, the colorimetric area extraction unit 317 according to the present embodiment determines a colorimetric area on the basis of extraction of a colorimetric area by analysis, designation of a colorimetric area or an exclusion area by a user in substantially the same manner as the first embodiment, or on the basis of such an extraction or designation by the user and the designated color information.

Figure 16:
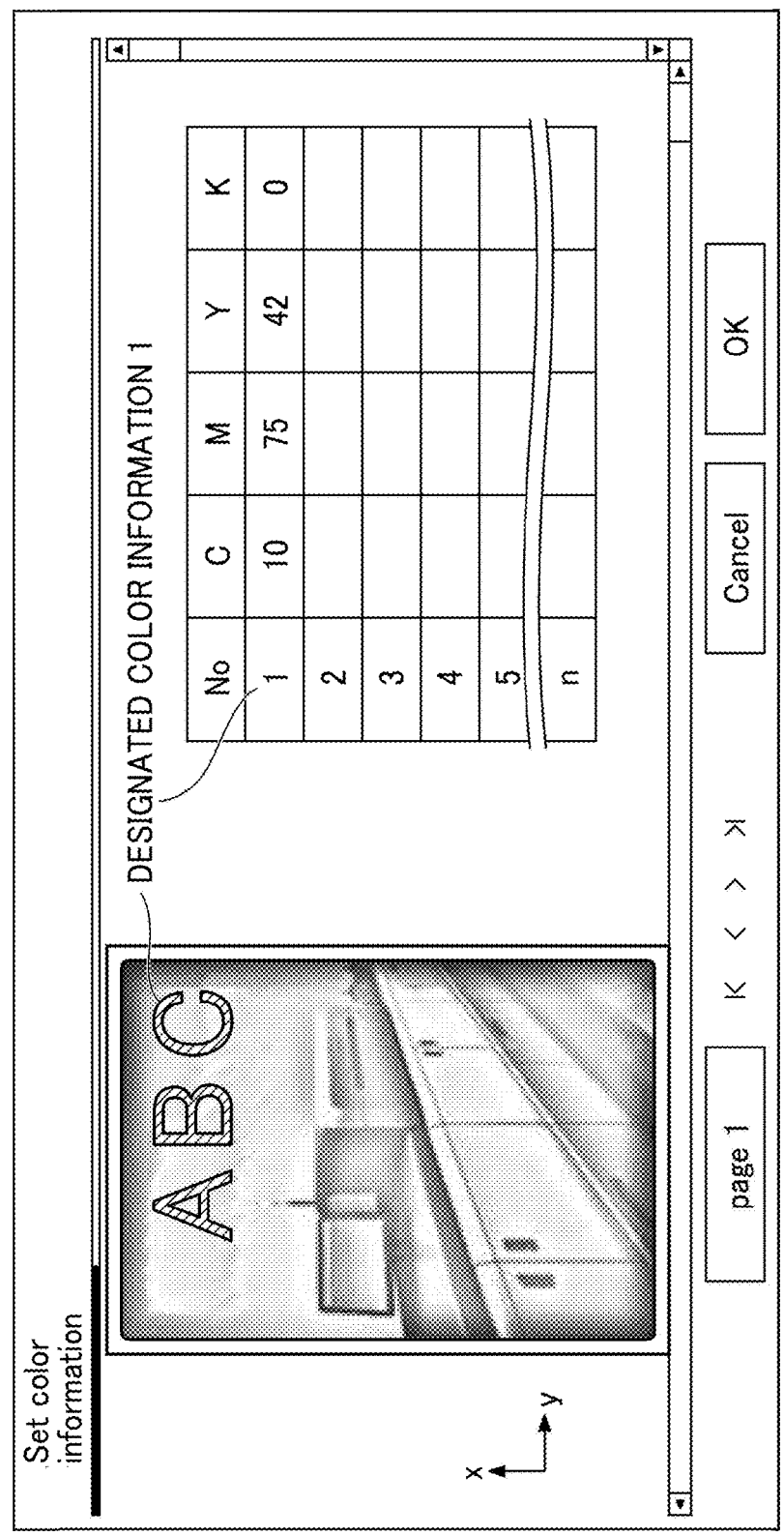
FIG. 16 is a first illustration of an example of a designated color setting screen according to the second embodiment.

FIG. 16 is a first illustration of an example of a designated color setting screen according to the second embodiment. The image forming apparatus 100 displays the designated color setting screen as illustrated in FIG. 16 on a monitor, for example. This allows a user to designate or select, for example, a particular color that the user wants to manage with attention. Thus, color difference determination is performed on the basis of a colorimetric value of the area.

The user enters a color that the user wants to designate, in other words, a gradation value of a color to be measured for each of CMYK on the designated color setting screen displayed on, for example, a monitor by using a mouse, a keyboard, or the like used for operating a computer. In response to the input of the gradation values, the colorimetric area extraction unit 317 extracts an area including the input gradation values. In the example of FIG. 16, an "ABC" logo area is extracted. Although FIG. 16 illustrates an example in which the user designates one color, this is just an example. In another example, the user designates multiple colors.

In another example, in a case that the user wants to newly designate a different color with respect to the already-input color information, the input information indicating the color is erased to allow the user to designate a color again. This enables to deal with a case where the user erroneously designates a color or a case where an area for which color management is to be performed is changed.

The colorimetric area extraction unit 317 extracts a colorimetric area based on the designated color information. The color difference determination unit 32 performs color difference determination based on a colorimetric value of the extracted colorimetric area. This allows a user to designate or select a particular color that the user wants to manage with attention. Thus, color difference determination based on a colorimetric value of an area that matches the designated or selected color is implemented.

In one example, the colorimetric area extraction unit 317 stores and manages the designated color information, calls the stored designated color information, and reuses the called designated color information in a case that a printing job relating to the designated color information is executed again after a certain period of time. This enables color difference evaluation of an area based on the same color information in the same printing job at the time of reprinting.

Figure 17:
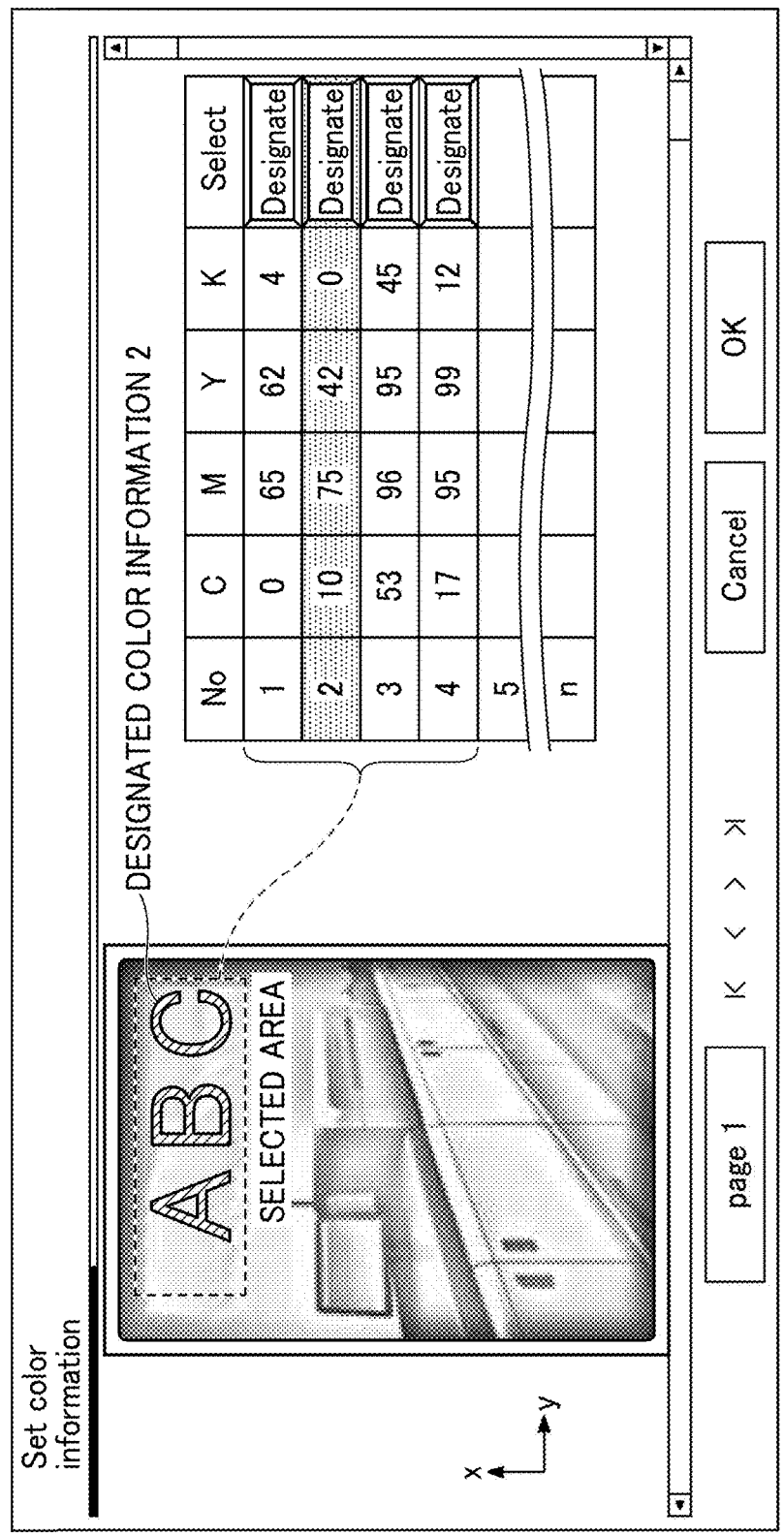
FIG. 17 is a second illustration of an example of the designated color setting screen according to the second embodiment.

FIG. 17 is a second illustration of an example of the designated color setting screen according to the second embodiment. In the designated color setting screen illustrated in FIG. 17, according to a user's operation of selecting an area to be designated such as an area framed by a broken line in the Figure, the image forming apparatus 100 displays a list of color information forming an image of the selected area in a color information list in the right area of the drawing.

Further, according to the user's operation of designating, from the displayed list, a particular color that the user wants to manage with attention, in other words, a color for which colorimetry is to be performed, the image forming apparatus 100 highlights an image area corresponding to the designated color information. For example, in the example of FIG. 17, the image forming apparatus 100 extracts, from the selected area, four colors as candidates of a color for which colorimetry is to be performed. In response to pressing of a "Designate" button corresponding to a color (colorimetry target) associated with No. 2 from the four colors, the image forming apparatus 100 highlights an "ABC" logo area. For example, one or more colors that can be measured are extracted as a candidate(s) for which colorimetry is to be performed from the selected area. In one example, in a case that no color that can be measured is included in the selected area, the image forming apparatus 100 displays an error message indicating that no color that can be measured is included in the selected area to guide the user or displays all colors or areas that can be measured including an area other than the selected area to guide the user.

The colorimetric area extraction unit 317 extracts a colorimetric area according to a result of the user's check of the displayed colorimetric area. For example, in response to pressing of a confirmation (OK) button with the particular color being designated, the colorimetric area extraction unit 317 extracts the selected area (the "ABC" logo area in the example of FIG. 17) as a colorimetric area. Although FIG. 17 illustrates an example in which the user designates one color, this is just an example. In another example, the user designates multiple colors.

In one example, the mode of designating the colorimetric area described with reference to FIG. 16 and the mode of designating the colorimetric area described with reference to FIG. 17 are used in combination.

A description is now given of an operation performed by the image forming apparatus 100 according to the present embodiment.

Figure 18:
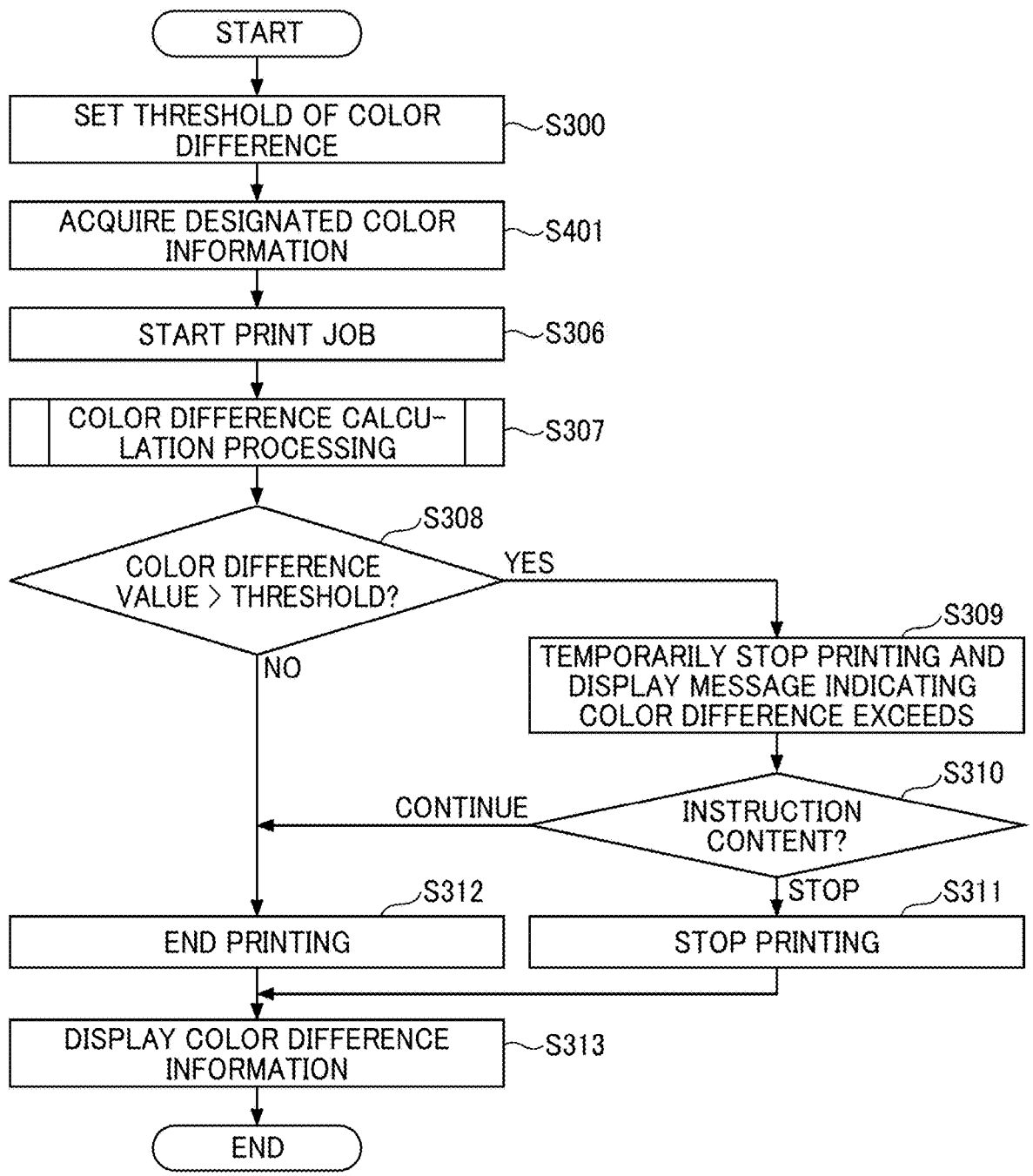
FIG. 18 is a flowchart of an example of a color stabilization processing, according to the second embodiment.

FIG. 18 is a flowchart of an example of color stabilization processing according to the second embodiment. The color stabilization processing according to the present embodiment includes a flow in which a process of step S401 is added instead of the processes of step S301 to step S305 in the color stabilization processing according to the first embodiment.

After step S300, the colorimetric area extraction unit 317 acquires designated color information (step S401). The designated color information is information indicating a color for which colorimetry is to be performed designated or selected by a user. The colorimetric area extraction unit 317 extracts a colorimetric area on the basis of the acquired designated color information.

Then, the image forming apparatus 100 performs the processes from step S306 to step S313 in the same or substantially the same manner as described in the first embodiment.

According to the present embodiment, in response to receiving an input of the designated color information indicating a color for which colorimetry is to be performed according to an operation by the user, the image forming apparatus 100 extracts a colorimetric area on the basis of on the selected designated color information. With this configuration, a color difference is determined on the basis of a color that a user wants to manage with attention. A color is made constant with high accuracy according to a simple operation by a user with respect to an area particularly for which the user wants to stably manage a color in an image for which the user instructs printing, such as a text area such as a logo, a company name, or a title to which the user wants to draw a viewer's attention, or a key color in a printed matter. In another example, the image forming apparatus 100 causes a monitor of the user terminal 200 connected to the image forming apparatus 100 or a monitor for displaying an operation screen or the like of the image forming apparatus 100 to display the above-described screens such as the calorimetric area designation screen, the color difference excess message display screen, the color difference information display screen, or the designated color setting screen.

In an embodiment, some of the functions of the image forming apparatus 100 may be implemented by an information processing apparatus. In one example, the information processing apparatus is configured as an information processing system including a plurality of computing devices such as a server cluster. In one example, the plurality of computing devices is configured to communicate with one another through any type of communication link including a network and a shared memory and performs the processes disclosed herein.

The functionality of the elements of the embodiments described above may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The image forming apparatus, the image forming system, and the program according to the present embodiment may be configured as an image forming apparatus, an image forming system, and a program described in the following aspects. Further, an image forming method described below may be implemented.

Aspects of Present Disclosure:

According to a first aspect, an image forming apparatus includes a colorimetric area extraction unit configured to extract a colorimetric area from an area in which an image as a print target is to be formed based on designation according to an operation by a user, and a color difference determination unit configured to calculate a color difference between a first page and a second page subsequent to the first page based on a colorimetric value in the extracted colorimetric area and to determine whether to continue printing according to the calculated color difference.

According to a second aspect of the present disclosure, in the image forming apparatus of the above first aspect, the color difference determination unit calculates, as the color difference, a difference between a colorimetric value in the colorimetric area of the first page of a copy as a reference among multiple copies of the print target and a colorimetric value of the second page of a copy for which determination is to be performed.

According to a third aspect of the present disclosure, in the image forming apparatus of the above first or second aspect, the first page is included in a first copy of a printing job, the second page is included in a second and subsequent copies of the printing job and has a same page number as the first page, and the color difference determination unit calculates the color difference between pages of the same page number of different copies and determines whether to continue printing based on the calculated color difference.

According to a fourth aspect of the present disclosure, in the image forming apparatus of any one of the above first to third aspects, the colorimetric area extraction unit extracts, as the colorimetric area, an area having a small variation in gradation in the image as the print target.

According to a fifth aspect of the present disclosure, in the image forming apparatus of any one of the above first to fourth aspects, in response to receiving designation of an exclusion area according to an operation by the user, the colorimetric area extraction unit extracts an area other than the exclusion area as the colorimetric area, the exclusion area being an area to be excluded from an area for which colorimetry is to be performed in the area in which the image is to be formed.

According to a sixth aspect of the present disclosure, in the image forming apparatus of any one of the above first to fifth aspects, in response to receiving designation of an area for which colorimetry is to be performed in the area in which the image is to be formed according to an operation by the user, the colorimetric area extraction unit extracts, as the colorimetric area, the area for which the designation is received.

According to a seventh aspect of the present disclosure, in the image forming apparatus of any one of the above first to sixth aspects, in response to receiving an input of designated color information indicating a color for which colorimetry is to be performed according to an operation by the user, the calorimetric area extraction unit extracts the colorimetric area based on the designated color information selected.

According to an eighth aspect of the present disclosure, in the image forming apparatus of the above seventh aspect, the image forming apparatus displays the calorimetric area determined based on the designated color information, and the colorimetric area extraction unit extracts the colorimetric area according to a result of the user's check of the displayed colorimetric area.

According to a ninth aspect of the present disclosure, in the image forming apparatus of any one of the above first to eighth aspects, the colorimetric area extraction unit receives at least one of designation of an exclusion area, which is an area to be excluded from an area for which colorimetry is to be performed in the area in which the image is to be formed, designation of a colorimetric area to be added, and designation of a color for which colorimetry is to be performed according to a user's operation based on a colorimetric area automatically extracted by the colorimetric area extraction unit, and sets an area changed based on the received designation as the colorimetric area.

According to a tenth aspect of the present disclosure, in the image forming apparatus of any one of the above first to ninth aspects, the colorimetric area extraction unit deletes designation of an area or a color according to an operation by the user and again receives designation of an area or a color.

According to an eleventh aspect of the present disclosure, in the image forming apparatus of any one of the above first to tenth aspects, the colorimetric area extraction unit stores information on an exclusion area designated in a printing job, calls the stored information on the exclusion area, and reuses the called information on the exclusion area when the printing job is executed again after a certain period of time.

According to a twelfth aspect of the present disclosure, in the image forming apparatus of any one of the above first to eleventh aspects, the colorimetric area extraction unit extracts the calorimetric area in a unit of an area having a pixel area specified in advance.

According to a thirteenth aspect of the present disclosure, in the image forming apparatus of any one of the above first to twelfth aspects, in a case that the colorimetric area extraction unit determines that an area having a small variation in gradation in the image as the print target does not have a pixel area specified in advance, the colorimetric area extraction unit extracts the colorimetric area in a unit of an area smaller than the pixel area.

According to a fourteenth aspect of the present disclosure, in the image forming apparatus of any one of the above first to thirteenth aspects, the color difference determination unit organizes color differences calculated respectively for colorimetric areas including the colorimetric area by classifying the color differences by designated areas and determines whether to continue the printing based on a color difference calculated according to a mean value of the colorimetric values for the designated areas and a mean value of reference values.

According to a fifteenth aspect of the present disclosure, in the image forming apparatus of the above fourteenth aspect, the image forming apparatus receives a setting of threshold values respectively for the designated areas, and the color difference determination unit compares the threshold values respectively with the color difference to determine whether to continue the printing.

According to a sixteenth aspect of the present disclosure, in the image forming apparatus of any one of the above first to thirteenth aspects, the color difference determination unit organizes color differences calculated respectively for colorimetric areas by classifying the color differences by same color systems and determines whether to continue the printing based on a color difference calculated according to a mean value of the colorimetric values for the color systems and a mean value of reference values for the color systems.

According to a seventeenth aspect of the present disclosure, in the image forming apparatus of the above sixteenth aspect, the image forming apparatus receives a setting of threshold values respectively for the same color systems, and the color difference determination unit compares the threshold values respectively with the color difference to determine whether to continue the printing.

According to an eighteenth aspect of the present disclosure, in the image forming apparatus of any one of the above first to seventeenth aspects, in a case that the color difference determination unit determines that the color difference exceeds a threshold value that is set, the image forming apparatus suspends the printing and display a message indicating that the color difference exceeds the threshold value.

According to a nineteenth aspect of the present disclosure, in the image forming apparatus of any one of the above first to eighteenth aspects, the image forming apparatus displays information indicating the calculated color difference.

According to a twentieth aspect of the present disclosure, an image forming system includes an image forming apparatus and a user terminal. The user terminal receives designation of an exclusion area, which is an area to be excluded from an area for which colorimetry is to be performed in an area in which an image as a print target is to be formed, or designation of an area for which colorimetry is to be performed in the area in which the image is to be formed. The image forming apparatus includes a colorimetric area extraction unit configured to extract a colorimetric area from the area in which the image as the print target is to be formed based on the designation of the exclusion area or the area for which the colorimetry is to be performed, and a color difference determination unit configured to calculate a color difference per copies based on a colorimetric value in the extracted colorimetric area and to determine whether to continue printing according to the calculated color difference.

According to a twenty-first aspect of the present disclosure, an image forming method performed by a computer includes extracting a colorimetric area from an area in which an image as a print target is formed, calculating a color difference per copies based on a colorimetric value in the extracted colorimetric area, and determining whether to continue printing according to the calculated color difference.

According to a twenty-second aspect of the present disclosure, carrier means carries computer readable codes for controlling a computer system to carry out a method including extracting a colorimetric area from an area in which an image as a print target is formed, calculating a color difference per copies based on a colorimetric value in the extracted colorimetric area, and determining whether to continue printing according to the calculated color difference.

According to the related art, since an image for inspection different from an image to be printed is printed and inspected, color variation of the image to be printed is not accurately inspected. The related art also does not address how to accurately inspect color variation of an image to be printed.

According to an aspect of the present disclosure, inspection accuracy of color variation of an image printed as a print target is enhanced.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus comprising circuitry configured to:
    extract a colorimetric area from an image formation area based on designation according to an operation by a user, the image formation area being an area in which an image as a print target is to be formed; and
    calculate a color difference between a first page and a second page subsequent to the first page based on a colorimetric value in the extracted colorimetric area, wherein
    the first page and the second page are printed according to a printing job for printing multiple copies of the print target,
    the first page is included in a first copy of the printing job,
    the second page is included in a second and subsequent copies of the printing job and has a same page number as the first page, and
    the circuitry calculates the color difference between pages having the same page number of different copies, and determines whether to continue printing based on the calculated color difference.

2. The image forming apparatus of claim 1, wherein the circuitry extracts, as the colorimetric area, an area having a small variation in gradation in the image as the print target.

3. The image forming apparatus of claim 1, wherein, in response to receiving designation of an exclusion area according to an operation by the user, the circuitry extracts an area other than the exclusion area as the colorimetric area, the exclusion area being an area to be excluded from an area for which colorimetry is to be performed in the image formation area.

4. The image forming apparatus of claim 1, wherein, in response to receiving designation of an area for which colorimetry is to be performed in the image formation area according to an operation by the user, the circuitry extracts, as the colorimetric area, the area for which the designation is received.

5. The image forming apparatus of claim 1, wherein, in response to receiving an input of designated color information indicating a color for which colorimetry is to be performed according to an operation by the user, the circuitry extracts the colorimetric area based on the designated color information selected.

6. The image forming apparatus of claim 5, wherein
the image forming apparatus displays the colorimetric area determined based on the designated color information, and
the circuitry extracts the colorimetric area according to an operation by the user indicating a result of check of the displayed colorimetric area.

7. The image forming apparatus of claim 1, wherein the circuitry
receives designation according to an operation by the user based on a colorimetric area automatically extracted by the circuitry, the designation including at least one of designation of an exclusion area, which is an area to be excluded from an area for which colorimetry is to be performed in the image formation area, designation of a colorimetric area to be added, or designation of a color for which colorimetry is to be performed, and
sets an area changed based on the received designation as the colorimetric area.

8. The image forming apparatus of claim 1, wherein the circuitry deletes designation of an area or a color according to an operation by the user and again receives designation of an area or a color.

9. The image forming apparatus of claim 1, wherein the circuitry stores information on an exclusion area designated in the printing job, retrieves the stored information on the exclusion area, and reuses the retrieved information on the exclusion area when the printing job is executed again after a certain period of time.

10. The image forming apparatus of claim 1, wherein the circuitry extracts the colorimetric area per unit area having a pixel area specified in advance.

11. The image forming apparatus of claim 1, wherein, in a case that the circuitry determines that an area having a small variation in gradation in the image as the print target does not have a pixel area specified in advance, the circuitry extracts the colorimetric area in a unit of an area smaller than the pixel area.

12. An image forming apparatus comprising circuitry configured to:
extract a colorimetric area from an image formation area based on designation according to an operation by a user, the image formation area being an area in which an image as a print target is to be formed;
calculate a color difference between a first page and a second page subsequent to the first page based on a colorimetric value in the extracted colorimetric area;
classify, by designated areas, color differences calculated respectively for colorimetric areas including the colorimetric area; and
determine whether to continue printing based on a color difference calculated according to a mean value of colorimetric values for the designated areas and a mean value of reference values.

13. The image forming apparatus of claim 12, wherein
the image forming apparatus receives a setting of threshold values respectively for the designated areas, and
the circuitry compares the threshold values respectively with the color differences to determine whether to continue the printing.

14. An image forming apparatus comprising circuitry configured to:
extract a colorimetric area from an image formation area based on designation according to an operation by a user, the image formation area being an area in which an image as a print target is to be formed;
calculate a color difference between a first page and a second page subsequent to the first page based on a colorimetric value in the extracted colorimetric area;
organize color differences calculated respectively for colorimetric areas by classifying the color differences by same color systems; and
determine whether to continue printing based on a color difference calculated according to a mean value of colorimetric values for the color systems and a mean value of reference values for the color systems.

15. The image forming apparatus of claim 14, wherein
the circuitry receives a setting of threshold values respectively for the same color systems, and
the circuitry compares the threshold values respectively with the color differences to determine whether to continue the printing.

16. The image forming apparatus of claim 1, wherein, in a case that the circuitry determines that the color difference exceeds a threshold value that is set, the circuitry suspends the printing and display a message indicating that the color difference exceeds the threshold value.

17. An image forming system comprising:
the image forming apparatus of claim 1; and
a user terminal
receiving designation of an exclusion area, which is an area to be excluded from an area for which colorimetry is to be performed in the image formation area, or designation of an area for which colorimetry is to be performed in the image formation area.

18. An image forming method performed by the image forming apparatus of claim 1.

* * * * *